United States Patent
Bullock et al.

(10) Patent No.: US 7,475,346 B1
(45) Date of Patent: Jan. 6, 2009

(54) SYSTEM AND METHOD FOR PROVIDING A CUSTOMIZABLE WEB PORTAL SERVICE

(75) Inventors: Theodore K. Bullock, Maple Glen, PA (US); Robert H. Verbeke, Exton, PA (US); Carl A. Grula, Lansdale, PA (US); John L. Krack, Fridley, MN (US); Joseph D. Condon, Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/469,904

(22) Filed: Dec. 22, 1999

(51) Int. Cl.
*G06F 17/00* (2006.01)
(52) U.S. Cl. .................. 715/513; 715/760; 715/517
(58) Field of Classification Search .............. 715/513, 715/517, 523, 760, 780; 707/1
See application file for complete search history.

(56) References Cited

U.S. PATENT DOCUMENTS

| | | | |
|---|---|---|---|
| 5,983,227 A * | 11/1999 | Nazem et al. ............. | 707/10 |
| 6,167,441 A * | 12/2000 | Himmel .................... | 709/217 |
| 6,185,587 B1 * | 2/2001 | Bernardo et al. .......... | 715/513 |
| 6,185,614 B1 * | 2/2001 | Cuomo et al. ............. | 709/224 |
| 6,412,008 B1 * | 6/2002 | Fields et al. .............. | 709/228 |
| 6,632,248 B1 * | 10/2003 | Isaac et al. ............... | 715/501.1 |
| 2002/0194267 A1 * | 12/2002 | Flesner et al. ............ | 709/203 |

OTHER PUBLICATIONS

Daily Jolt, http://www.dailyjolt.com archived Oct. 12, 1999.*
"Accepting Input from the Browser", http://www.cs.cf.ac.uk/Dave/PERL/node226.html last updated Dec. 8, 1999.*

* cited by examiner

*Primary Examiner*—Heather R. Herndon
*Assistant Examiner*—Adam M Queler
(74) *Attorney, Agent, or Firm*—Robert P. Marley; Woodcock Washburn LLP

(57) ABSTRACT

A customizable Web portal service comprises a server that hosts a master Web site. The master Web site serves as a Web portal. Users of a first class can establish accounts on the server. For each account holder, the server hosts a separate copy of the master Web site. Each account holder can customize its copy of the master Web site in accordance with a first level of customizability. In addition, users of a second class can create customized copies of the master Web site and of the account holder copies thereof in accordance with a second level of customizability.

34 Claims, 16 Drawing Sheets

SYSTEM AND METHOD FOR PROVIDING A CUSTOMIZABLE WEB PORTAL SERVICE

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention is directed to computer systems and services, and more particularly, to a system and method for providing customizable web portal services.

BACKGROUND

The Internet comprises a vast number of computers and computer networks that are interconnected through communication links. The interconnected computers exchange information using various services, such as electronic mail, Gopher, and the World Wide Web ("WWW" or "the Web"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When the Web server receives the request, it sends that Web page to the client computer system. When the client computer system receives that Web page, it typically displays the web page using a Web browser. A Web browser is a special-purpose application program that effects the requesting of Web pages and the displaying of Web pages. Examples of commercially available Web browsers are Microsoft® Internet Explorer and Netscape® Navigator®.

Web pages are typically defined using the HyperText Markup Language ("HTML"). HTML provides a standard set to tags that define how a Web page is to be displayed. When a user indicates to a Web browser to display a Web page, the Web browser sends a request to the server computer system to transfer to the client computer system an HTML document that defines the Web page. When the requested HTML document is received by the client computer system, the Web browser displays the Web page as defined by the HTML document. A Web page (i.e., HTML document) typically contains a variety of Web page elements, such as tags that control the displaying of text, graphics, controls, and other features. A Web page may also contain hyperlinks to other Web pages available on that server computer system or other server computer systems on the Web. A user can "follow" a hyperlink to another Web page by moving a mouse cursor over the link and depressing the mouse button. A Web page can also include other Web page elements, such as animations, videos, Java Applets, Active X controls, and the like.

One increasingly popular form of Web site is referred to as a Web portal. A Web portal is a Web site that offers a centralized point of access to other resources and services on the Web, including other Web sites and Web pages. A Web portal site typically consists of one or more Web pages that provide various menus of hyperlinks, usually grouped by subject. For example, a Web portal site might provide a menu of hyperlinks to various news sources on the WWW, and another menu of hyperlinks may point to various on-line shopping Web sites. Another menu of hyperlinks may point to selected Web sites specializing in travel services. Some Web portal sites may specialize in only one type of information, for example, computer helpdesk services, travel services, on-line shopping services, etc. Examples of Web portal sites that offer hyperlinks to a variety of different services on the Web are www.yahoo.com and www.lycos.com.

Some Web portal sites, including, for example, both www.yahoo.com and www.lycos.com, allow users to create personalized versions of these Web sites, wherein the user can select which hyperlinks are displayed on that user's personalized version of the site and can arrange some elements of the screen display. Typically, a user desiring to create a personalized version of one of these Web portal sites must register with the site, usually providing a username and password. Thereafter, the user can "login" to his/her personalized version of the site by entering the username and password at a login prompt.

Hosting and maintaining a Web portal site can be difficult and expensive. Many companies and organizations that might otherwise desire to provide a Web portal site for use by their members, employees, or customers do not have the technical or financial resources to do so. Accordingly, it would be desirable to provide a service that offered these companies and organizations the use of a preexisting Web portal site, hosted and maintained by another party, that can be customized by each company or organization to meet the specific needs of its members, employees, or customers. In addition, it would be desirable if the members, employees, or customers of a given company or organization could further customize the preexisting Web portal site to create personalized versions thereof. The present invention is directed to a system and method for providing such a service.

SUMMARY OF THE INVENTION

The present invention is directed to a system and method for providing a customizable Web portal service. According to the invention, a master Web site that serves as a Web portal is hosted on a server that is connected to a network, such as the Internet. The master Web site has a unique Uniform Resource Locator (URL) that can be used to access the master Web site from a client program, such as a Web browser, via the network. Users of a first class can establish accounts on the server, and for each account holder, the server hosts a separate copy of the master Web site. Each account holder copy of the master Web site has it own URL. Each account holder can customize its copy of the master Web site in accordance with a first level of customizability. Further according to the present invention, users of a second class can create customized copies of the master Web site or of the account holder copies thereof in accordance with a second level of customizability. Preferably, the first level of customizability available to account holders will permit a greater degree of customization than the second level of customizability available to the second class of users.

All or portions of the system and method of the present invention may be embodied in the form of program code stored on a computer-readable medium that, when executed, carries out the present invention.

The owner of the server that hosts the master Web site and the account holder copies thereof may charge a fee for the customizable Web portal service. For example, the owner of the server may charge a fee to each account holder. The fee may take the form of a one-time payment to establish an account on the server, a monthly service fee to host the account on the server, a fee based on the number of "hits" to the account holder's copy of the master Web site, or some combination of these kinds of fees. The fee could also be based on the degree to which an account holder customizes its copy of the master Web site. Alternatively, the owner of the server can provide the customizable Web portal service for free, relying instead on other business benefits of hosting such a service. For example, the owner of the server may generate revenue from the advertisements displayed on the master Web site and the account holder copies.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
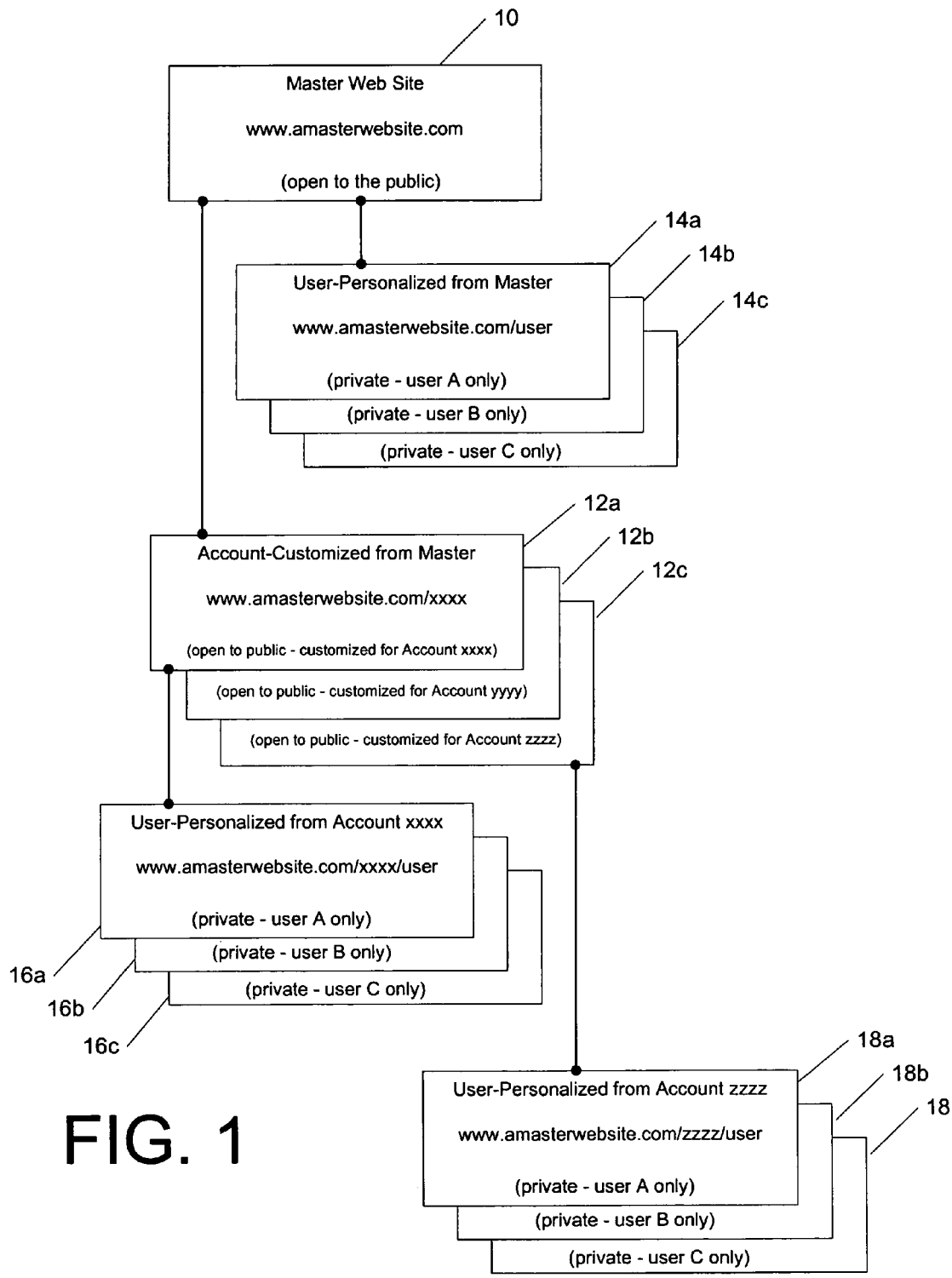
FIG. 1 is a graphical representation of a customizable Web portal service that can be created with the method and system of the present invention.

The present invention is directed to a system and method for providing a customizable Web portal service. According to the invention, a master Web site that serves as a Web portal is hosted on a server that is connected to a network, such as the Internet. The master Web site has a unique Uniform Resource Locator (URL) that can be used to access the master Web site from a client program, such as a Web browser, via the network. Users of a first class can establish accounts on the server, and for each account holder, the server hosts a separate copy of the master Web site. Each account holder copy of the master Web site has its own URL. Each account holder can customize its copy of the master Web site in accordance with a first level of customizability. Further according to the present invention, users of a second class can create customized copies of the master Web site or any of the account holder copies thereof in accordance with a second level of customizability. Preferably, the first level of customizability available to account holders will permit a greater degree of customization than the second level of customizability available to the second class of users.

Typically, users of the first class, who establish accounts on the server, will include companies, organizations, or other entities desiring to provide a Web portal for use by their members. An account holder of this type will typically supply the unique URL of its copy of the master Web site to its members, who can then use that URL to access the account holder copy of the master Web site. While account holders will most often be companies, organizations, or other multi-member entities, individuals can become account holders on the server, if desired.

The second class of user typically will include the members, employees, or individuals associated with a company, organization, or other entity that has established an account on the server. This class of user can access the master Web site or the account holder copy of the master Web site using the URL assigned to the site. According to the present invention, users of this second class can create their own customized (i.e., personalized) copies of the master Web site or of one or more of the account holder copies thereof.

An account holder can restrict access to its customized copy of the master Web site by only publishing the URL for its copy to its members. If desired, an account holder can also restrict access to certain services available via links on the account holder's customized copy of the master Web site by enabling those links only for users associated with the account holder's account. These privileged services may be provided by the account holder, the owner of the server that hosts the master Web site, or even a third-party.

The owner of the server that hosts the master Web site and the account holder copies thereof may charge a fee for the customizable Web portal service. For example, the owner of the server may charge a fee to each account holder. The fee may take the form of a one-time payment to establish an account on the server, a monthly service fee to host the account on the server, a fee based on the number of "hits" to the account holder's copy of the master Web site, or some combination of these kinds of fees. The fee could also be based on the degree to which an account holder customizes its copy of the master Web site. Alternatively, the owner of the server can provide the customizable Web portal service for free, relying instead on other business benefits of hosting such as service. For example, the owner of the server may generate revenue from advertisements displayed on the master Web site and the account holder copies.

As an example of the usefulness of the Web portal service that can be created with the method and system of the present invention, consider a company A with an internal helpdesk service, but with neither the technical nor financial resources to establish a comprehensive Web portal site as an information resource for its employees or customers. Company Z could provide such a comprehensive resource on the Internet using the method and system of the present invention. Company Z could then negotiate an agreement with Company A to create an account for Company A on Company Z's server and to provide Company A with a copy of Company Z's Web portal site. Company Z could then allow Company A, using the invention, to customize its copy of Company Z's Web portal site to suit its own needs—including, for example, the ability to change branding graphics so that the customized Web site includes Company A's logo, advertising, and other branding, making it look like it was provided by Company A. Company A could then distribute the URL for its customized copy of the Web site to its employees (and perhaps customers), thereby providing a valuable service using Company Z's technology and infrastructure. If desired, Company A could also restrict access to certain services (which could be provided by Company Z, Company A, or even a third-party company) by enabling the links to those privileged services only for users (i.e., employees or customers) associated with Company A's account.

For purposes of additional clarification, the following terms have the following meanings:

"Customization" of the master Web site or of an account holder copy of the master Web site means to add, remove, or modify certain Web pages or Web page elements, including text, graphics, and hyperlinks, to suit individual needs and preferences.

"Level of customizability" refers to the degree to which a given class of user is permitted to modify the different elements of a Web page, such as its text, graphics, and hyperlinks. In the present embodiment, the first level of customizability (available to account holders) allows customization of a greater number of Web page elements of the master Web site or a copy thereof than the second level of customizability (available to the second class of users), as described more fully hereinafter. For purposes of distinguishing the first level of customizability from the second level of customizability in this discussion, the first level of customizability may be referred to as "account customization" or simply "customization," and the second level of customization may be referred to as "personalization."

FIG. 1 is a graphical representation of the customizable Web portal service that can be created with the method and system of the present invention. In this example, a master Web site 10, having a URL of www.amasterwebsite.com, is hosted on a server in accordance with the present invention. Three separate accounts have been established, named "xxxx," "yyyy," and "zzzz," respectively. Each account has been provided with a separate copy of the master Web site (i.e., copies 12a, 12b, and 12c, respectively). Each of these copies 12a, 12b, and 12c, is assigned a unique URL, which in the present example is formed by appending the account name to the URL of the master Web site 10, yielding www.amasterwebsite.com/xxxx, www.amasterwebsite.com/yyyy, and www.amasterwebsite.com/zzzz, respectively. Each account holder is able to customize its copy of the master Web site. In this example, the master Web site 10 and each account holder copy 12a, 12b, 12c are open to the public, i.e., accessible by users of the second class via a network, such as the Internet.

As further shown, in this example, three users of the second class, identified as Users A, B, and C, have each created personalized copies of the master Web site (14a, 14b, 14c, respectively), and of the account holder copies of accounts xxxx (16a, 16b, 16c, respectively) and zzzz (18a, 18b, 18c, respectively). The account holder copy 12b of account yyyy has not been personalized by any user. In practice, a single user of the second class will likely find it difficult to mange so many personalized sites, but the example illustrates the flexibility of the present invention.

In the present embodiment, the master Web site comprises one or more Web pages. A Web page comprises one or more Web page elements, such as text, graphics, and hyperlinks. Other kinds of Web page elements include, for example, animations, videos, Java Applets, Active X controls, and the like. A given Web page can comprise a single, static file containing all of the Web page elements and the structured encoding for displaying them (e.g., HTML code), or alternatively, a given Web page (or even an entire site consisting of multiple pages) can be generated dynamically from a definition file or data structure that identifies the Web page elements and the structural encoding necessary to assemble the Web page for sending to a requesting client browser. Some form of assembly or generation engine is then needed to generate the actual Web pages from the definition file. Methods for creating and sending both static and dynamically generated Web pages are well known. In the present embodiment, the Web page(s) of the master Web site (and therefore each account holder copy of the Master Web site) are preferably dynamically generated by the hosting server from a definition file describing the elements and structural encoding of the page, as described more fully below. Dynamic generation of Web pages facilitates account holder customization and user personalization, as it is easier to modify a Web page definition file than a static Web page. However, in other embodiments, static Web page files can be used.

Figure 2:
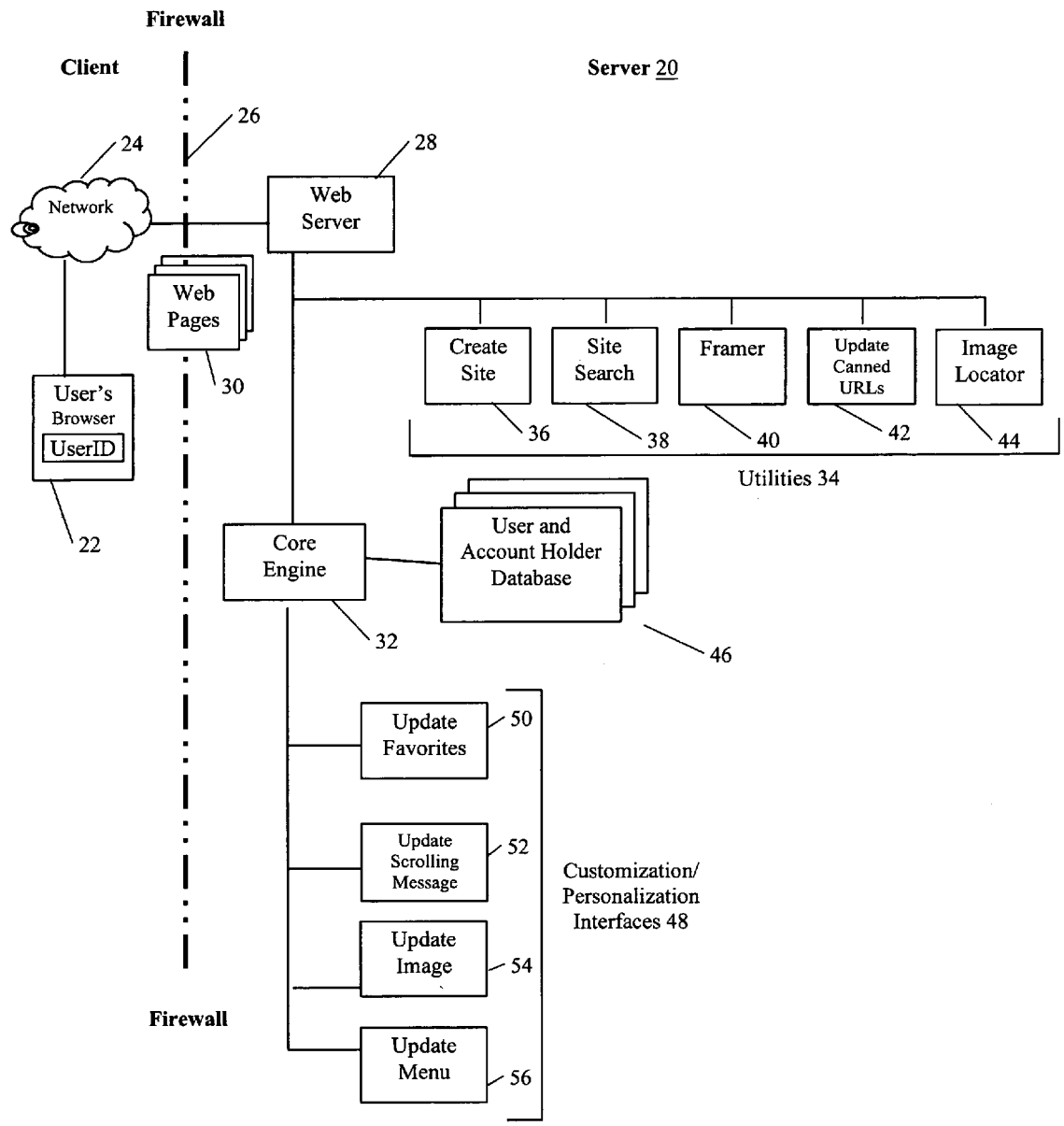
FIG. 2 is a block diagram of a system for providing the customizable Web portal service of FIG. 1, in accordance with an embodiment of the present invention.

FIG. 2 is a block diagram of the system of the present invention, which enables the customizable Web portal service to be provided. As shown, the system comprises a server 20 that is connected to a network 24 behind a firewall 26. Account holders and users can use a client device 22 to access the server 20 via the network 24. The server 20 hosts the master Web site, as well as the account holder customized, and user personalized, copies thereof.

The client device 22 used by an account holder or user to access the server 20 preferably comprises a personal computer or workstation equipped with a Web browser, such as Microsoft® Internet Explorer, Netscape® Navigator®, or the like. Alternatively, the client device 22 could be a personal digital assistant (PDA), browser-enabled wireless telephone, or other device or terminal capable of accessing a Web site over the network 24. The network 24 may comprise the Internet, an intranet, or any other hardwired or wireless network that supports Web-based technologies, including for example, local area networks (LAN), wide area networks (WAN), and cellular, wireless, microwave, and satellite networks.

The firewall 26 manages access to the server 20 from the network 24 to secure the server 20 against unauthorized access. Firewalls can be implemented in hardware, software, or a combination of both. Firewall products are available from a number of software and hardware vendors. Any suitable firewall product that provides a level of security desired by the server owner can be used in the system of FIG. 2. Alternatively, the firewall can be eliminated, if desired.

In the presently preferred embodiment, the server 20 comprises a Core Engine 32, a Web server 28, a plurality of Utilities 34, a database 46 of user and account holder profiles and Website definition files, and a plurality of customization/personalization interfaces 48. The server 20 can be implemented on a single computer system or on a combination of individual computer systems networked, clustered, or otherwise connected together.

As mentioned above, in the present embodiment, the Web page(s) of the master Web site, each account holder copy of the Master Web site, and the user personalized copies thereof, are preferably dynamically generated from respective definition files containing the Web page elements and structural encoding necessary to dynamically create the Web pages "on-the-fly". These definition files are stored in the database 46. The database 46 comprises a directory hierarchy in which the profiles of each account holder and user are stored in sub-directories, along with the definition files of any customized or personalized Web sites created by each account holder and user. Further details concerning the structure of the database 46 are provided in connection with the discussion of FIG. 3C below.

Still referring to FIG. 2, the Core Engine 32 controls the overall operation of the server 20 in accordance with the present invention. One function that the Core Engine 32 performs is to dynamically generate the Web pages of the master Web site and the user and account holder copies thereof from the respective definition files for those sites. The Core Engine 32 also coordinates the on-line customization and personalization processes, as described hereinafter. In the present embodiment, the Core Engine 32 is implemented as a Common Gateway Interface (CGI) program written in the C programming language.

The Web server 28 serves the Web pages of the master Web site and user and account customized copies thereof generated by the Core Engine 32 to the users and account holders via the network 24 as illustrated at 30. In the present embodiment, the URLs used to access the master Web site, the account customized sites, and the personalized sites are constructed to be "user friendly" by using only simple path elements, without requiring obscure parameters that would be different for a user to remember. The information in the incoming URL structure is sufficient to programmatically determine which user or account holder Website definition file in database 46 to process. This determination and processing is accomplished by the Core Engine 32. However, since the URL itself does not provide a path directly to the Core Engine 32, a Web server operating in "normal" mode would not know how to process the incoming URL. It is therefore necessary to dynamically "re-direct" the incoming URL to launch the Core Engine 32. This is accomplished by using a Web server that supports server rules, in which a set of server rules is defined to dynamically transform an incoming URL to a call to the Core Engine 32 and to pass the appropriate parameters via the transformed URL. Web servers that support server rules, and which can be used to implement the Web server 28, include the Apache, Cern, and Stronghold Web Servers. Web servers that do not support rules can also be used, but the URL format required to access the master, account customized, and personalized sites would have to be more complex and thus less desirable from the user perspective.

The Utilities 34 are provided to implement certain features of the master Web site and customized copies thereof and to provide tools for managing and maintaining the Web sites. In the present embodiment, a Create Site utility 36 is used by the server owner, an account holder, or a user to create a new customized or personalized copy of the master Web site. A Site Search utility 38 is a search engine that can be used by users and account holders to search a canned URL list provided by the server owner. The canned URL list can also be used by account holders and users when customizing or personalizing their sites, as described more fully below. A Framer utility 40 is used by the Core Engine 32 to populate and to display any Web page frames defined in the definition file of a given account holder or user customized site. An Update Canned URLs utility 42 is used by the server owner 20 to maintain the canned URL list. An Image Locator 44 is used by the Core Engine 32 to locate graphical images, which may be either local to the server 20 or remotely located on another server anywhere on the network 24, to be included on a given Web page being constructed by the Core Engine.

The customization/personalization interfaces 48 provide interfaces for account holders and users to interact with the server 20 to customize or personalize their copies of the master Web site or an account holder copy thereof. An account holder or user invokes these interfaces from an "Edit" mode (described hereinafter) to customize various elements of the site. The number and type of customization/personalization interfaces will depend upon the number and types of different Web page elements that the master Web site designer wishes to make available for customization or personalization. In this embodiment, the first and second levels of customization are established by enabling different customization/personalization interfaces at each level. For example, all of the customization/personalization interfaces may be enabled at the first level, but some interfaces may not be made available at the second level of customization.

As described more fully below, in the present embodiment, the customizable Web page elements of the master Web site include a "Favorites" list of hyperlinks, one or more graphical images, a scrolling message displayed at the top of the main Web page of the master Web site, and a menu providing submenus of hyperlinks to other menus of the site and to other pages and sites on the network. In this embodiment, therefore, the customization/personalization interfaces 48 comprise an Update Favorites interface 50 that enables a user or account holder to customize the "Favorites" list of hyperlinks, an Update Scrolling Message interface 52 that enables an account holder to customize or remove the scrolling message, an Update Menu interface 56 that allows a user or account holder to customize the menu of hyperlinks displayed on the master Web site or an account holder copy thereof, and an Update Image interface 54 that enables account holders to customize the graphical images on the account holder's copy of the master Web site. In the present embodiment, the Update Scrolling Message interface 52 and the Update Image interface 54 are only enabled in the first level of customization available to account holders, not in the second level of customization available to users of the second class.

In the present embodiment, each customization/personalization interface is implemented as a CGI program, written in the C programming language, that generates a Web page containing an HTML form that the user or account holder then interacts with to perform the desired customization of a given Web page element (e.g., Favorites list, scrolling message, graphical image, menu, etc.) Depending upon the situation, the CGI program may generate other HTML forms to dialog with the user or account holder and to complete the customization task. In other embodiments, other Web technologies for implementing the functions of the Core Engine 32 and the customization/personalization interfaces can be employed, including, for example, Microsoft Active Server Pages (ASP), Java servlets, Java scripts, and PERL scripts.

Figure 3A:
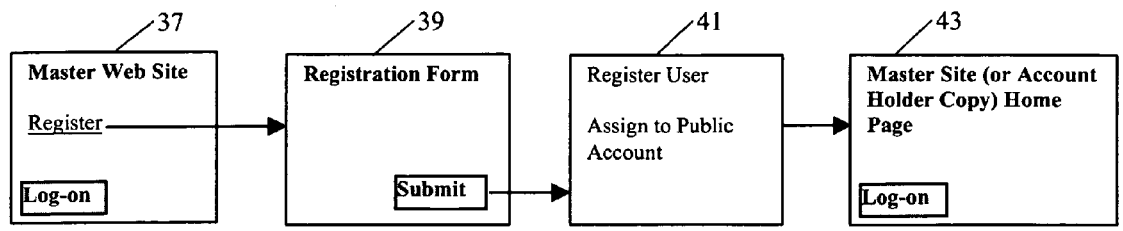
FIG. 3A is a flow diagram illustrating a user registration process of the system of FIG. 2, in accordance with a preferred embodiment of the method and system of the present invention.

Referring now to FIG. 3A, in the present embodiment, before any user can create a customized or personalized copy of the master Web site or any existing account holder copy thereof, the user must first register with the server 20 to establish a user identification (UserID) and a password, and an internal user profile defining that user's characteristics and privileges. The user is uniquely identified by the UserID, and is authenticated by the password. This registration process is illustrated in FIG. 3A.

As shown, at step 37, registration is performed by clicking on a 'Register' link on the master Web site. This displays a Registration Form, which the registrant completes and submits at step 39. The Registration Form included entry fields for the user's personal information, such as name, address, company, telephone number, email address, etc. The Registration Form also requires the user to specify a UserID and password. If the specified UserID is currently in use by another user, the registering user is so advised and is asked to select another.

After the Registration Form is submitted, at step 41, a user profile containing, for example, the user's personal information, is created for the new user, and the user is assigned to a public account. The public account is associated with the master Web site and serves as a default account for new users. At this point, the registered user is, by default, a user of the second class. As illustrated at step 43, the registered user can use the UserID and password to logon to the server 20 at the master Web site or at an account holder copy thereof. A registered user of the second class is permitted to create personalized copies of the master Web site and any account holder copies thereof, in accordance with the process illustrated in FIG. 5 and described below.

Figure 3B:
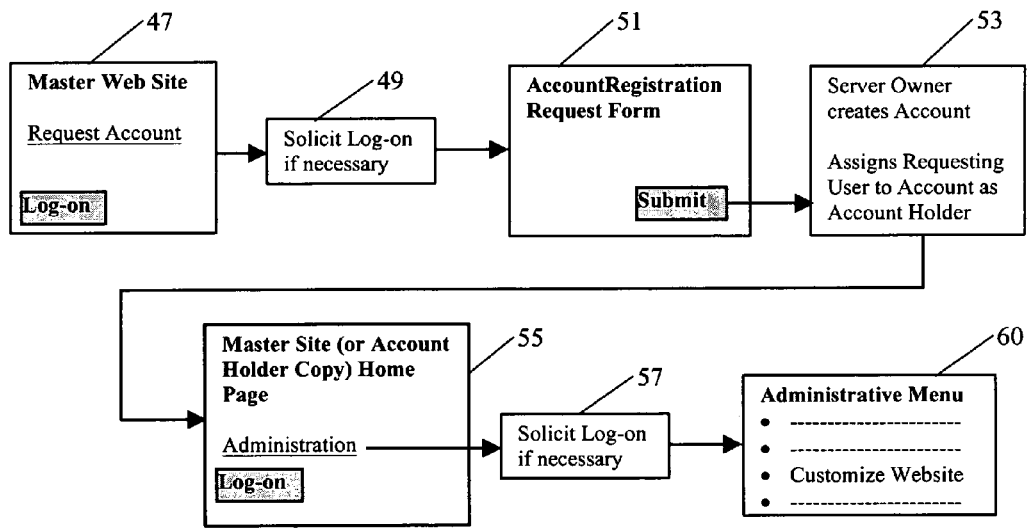
FIG. 3B is a flow diagram illustrating an account creation process of the system of FIG. 2, in accordance with a preferred embodiment of the method and system of the present invention.

Referring to FIG. 3B, an organization, company, or entity (or even an individual if desired) that wishes to become an account holder may make such a request to the owner of the server 20. In the present embodiment, such a request will preferably be made by some representative of the organization, company, or entity who is already a registered user in the public account. The request is made as follows. At step 47, the registered user selects a "Request Account" link from the master Web site (which could be provided, for example, as part of a menu of administrative options). If the user has not yet logged-on, then at step 49, the user will be asked to log-on. At step 51, the user is presented with an on-line Account Registration Request Form. After the form is completed, the user submits the form, which is then sent internally to the server owner or a representative of the server owner, such as a server administrator. In other embodiments, a request for an account could instead be made to the server owner via e-mail, telephone, or any other method identified by the server owner.

In response to the request, at step 53, the server administrator verifies the requester's credentials, establishes any appropriate contractual relationship, and, using an internal administrative interface (not shown) provided on the server 20, establishes an account on the server 20, resulting in the creation on the server 20 of a subdirectory in the database 46 for the account. In addition, the server administrator moves the requester's user profile from the public account to the new account, and gives the new account holder certain administrative privileges, including the ability to create an account holder copy of the master Web site that the account holder can customize, as described more fully below in connection with FIG. 4. These actions thus establish the account holder as a user of the first class.

Still referring to FIG. 3B, an account holder exercises the account holder's administrative privileges, such as customizing the account holder's copy of the master Web site, by selecting an Administrative link on the master Web site or the account holder's copy thereof, as illustrated at step 55. At step 57, if the account holder is not already logged-on, the account holder will be prompted to do so. At step 60, the account holder is presented with an Administrative Menu providing access to various administrative functions that the account holder is permitted to perform. In addition to creation and customization of an account holder copy of the master Web site, other privileges available to the account holder include the ability to create new user profiles, for example for the individual members, employees, or customers of the account holder, and to attach them to the account holder's account. An account holder can also move the profiles to other registered public users in the public account to the account holder's account, making these users members of the account holder's account. The account holder may also bestow some or all of these account holder privileges to any other member of the account, allowing these co-account holders to assist in maintaining the account holder's copy of the master Web site.

Figure 3C:
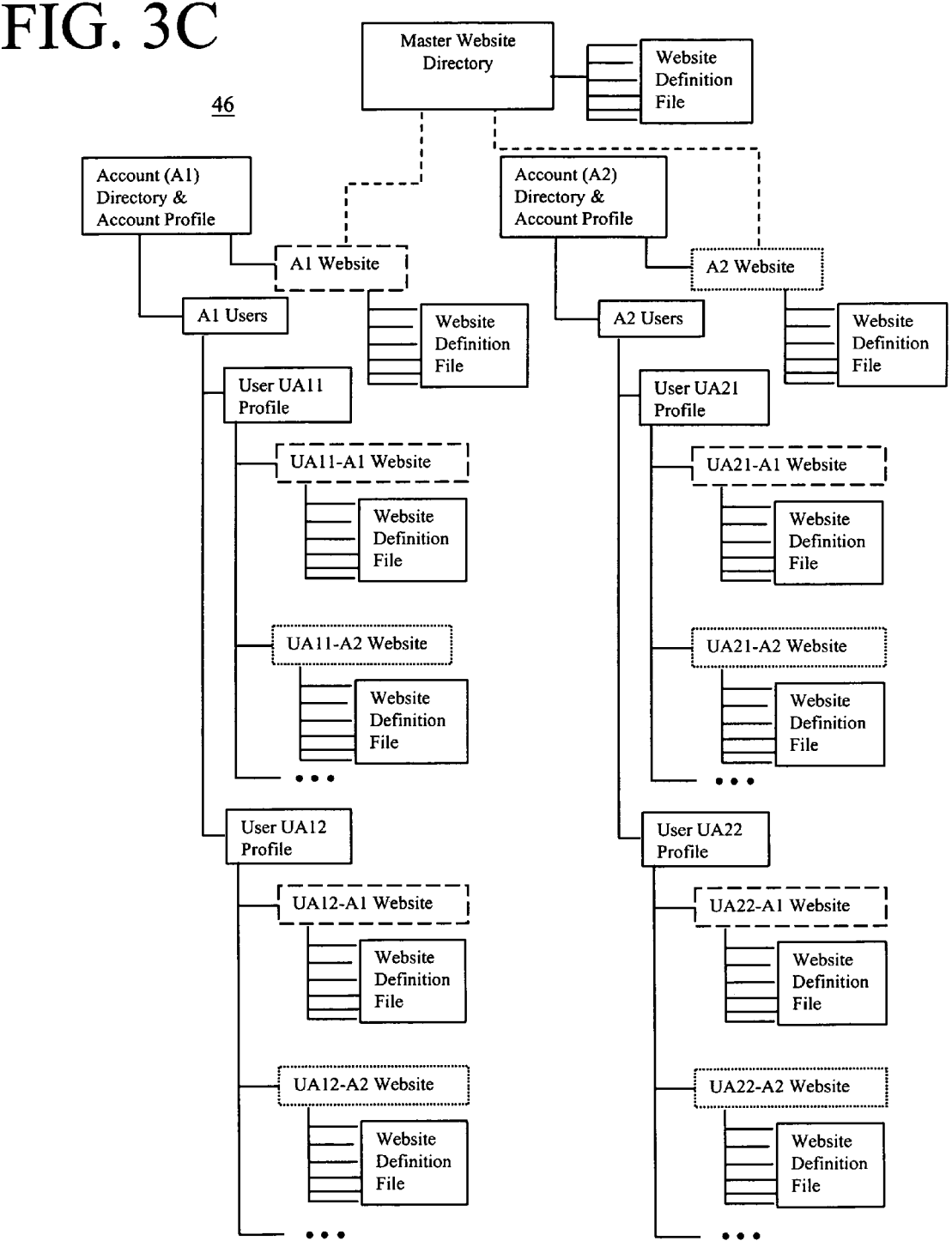
FIG. 3C graphically illustrates a directory structure of a database of account holder and user profiles of the system of FIG. 2 that is created during the registration and account creation processes illustrated in FIGS. 3A and 3B.

FIG. 3C illustrates the database structure that results from the user registration and account creation processes described above and illustrated in FIGS. 3A and 3B. As shown, the definition file containing the data elements and structural encoding that define the Web page(s) of the master Web site is stored at the top of the hierarchy. As explained above, when a user establishes an account on the server 20, an account sub-directory for the account is created in the database 46. In the example shown, two accounts, A1 and A2, have been established and a sub-directory has been created for each of them, labeled "Account (A1) Directory" and "Account (A2) Directory", respectively. A profile for each account holder is also stored in its respective directory. When an account holder creates a customized copy of the master Web site via the administration menu, as illustrated in greater detail in FIG. 4 described below, the definition file that defines the master Web site is copied to the account holder sub-directory in the database. Thus, the account holder copy of the master Web site is managed internally as an independent copy within its sub-directory, with its only association with the master Web site being the dynamic inheritance of certain Web page elements from the master Web site.

As also illustrated in FIG. 3C, each account holder sub-directory contains user profiles for each user of the second class that is associated with the account holder's account. In this example, the sub-directory of account A1 includes a user profile for a user UA11 and another profile for a user UA12. Similarly, the sub-directory of account A2 includes a user profile for a user UA21 and another profile for a user UA22. The account holder could have created these user profiles and attached them to the account holder's account directly, or alternatively, the account holder could have moved these profiles from the public account into the account holder's account sub-directory.

Each user of the second class in the public account or in an account holder account can create a personalized copy of the master Web site or any of the account holder copies thereof, as described more fully below in connection with FIG. 5. When a particular user creates a personalized copy of a site, the definition file that defines that site is coped into the user's profile within the account sub-directory to which the user is attached. For example, as shown in FIG. 3C, user UA11 has created personalized copies of both account holder A1's copy of the master Web site and account holder A2's copy of the master Web site. Note that, in the present embodiment, a given registered user of the second class can only be attached to one account—either the public account or one of the account holder accounts. However, that user is permitted to create personalized copies of any one or more of the master Web site and account holder copies thereof. Thus, as illustrated in FIG. 3C, a user's profile in a given account may contain a personalized copy of more than one site. Indeed, a user attached to a given account can create a personalized copy of the master Web site, a personalized copy of the customized site of the account holder to which the user belongs, and a personalized copy of any other account holder's customized site. The files defining all such personalized copies will be stored in the user's profile under the sub-directory of the account to which the user is attached.

Figure 4:
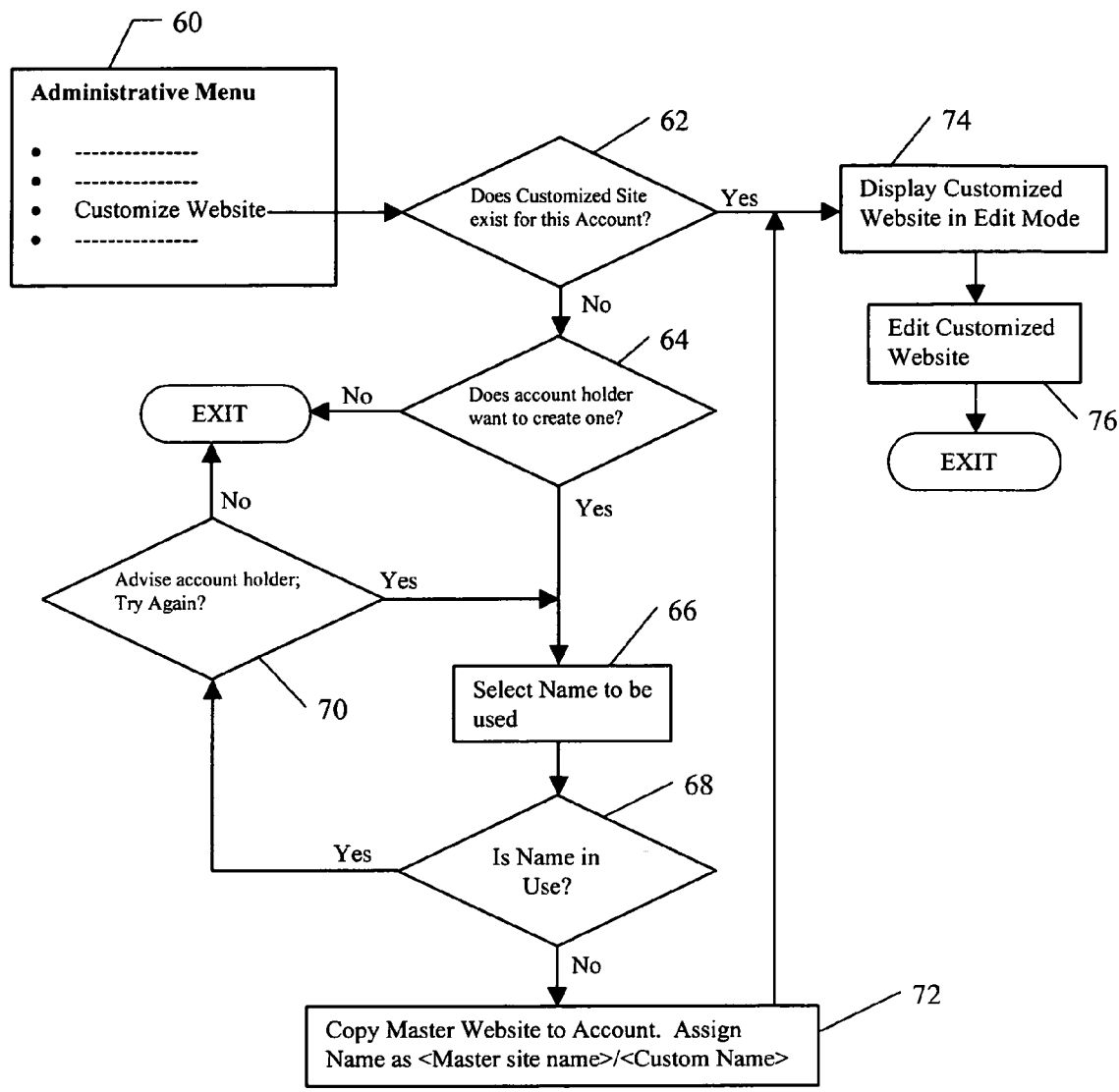
FIG. 4 is a flow diagram illustrating further details of the operation of the system of FIG. 2, as well as a preferred embodiment of an aspect of the method of the present invention.

FIG. 4 is a flow diagram illustrating the process of account customization in accordance with the present embodiment of the method and system of the present invention. The overall process is coordinated by the Core Engine 32. At step 60, an account holder enters the administrative menu from the master Web site or the account holder's copy thereof if already created. The administrative menu includes a "Customize Website" option. When the account holder selects this option, control passes to step 62. At step 62, the Core Engine 32 determines whether a copy of the master Web site has already been created for this account holder. If not, at step 64, the Core Engine 32 prompts the account holder to indicate whether the account holder desires to create a copy of the master Web site for this account. If not, then the process terminates, and control passes back to the administrative menu.

If the account holder does wish to create a copy of the master Web site for this account, then at step 66, the account holder is prompted to enter a name to be used for the account, which in the preferred embodiment, will be appended to the URL for the master Web site to create the unique URL for the account holder copy. At step 68, the Core Engine 68 determines whether the name is already being used by another account. If so, then at step 72, the account holder is prompted to try again or to terminate the process. If the account holder does not wish to continue, then control will pass back to he administrative menu. If the account holder does with to try again, then control passes back to step 66 for entry of another name. If the selected name is not in use, then control passes to step 72, where the definition file for the master Web site (i.e., the file that defines the site) is copied to the account holder's sub-directory in the database 46. In the present embodiment, steps 66 through 72 are carried out by the Create Site utility 36 at the direction of the Core Engine 32.

Once the account holder copy of the master Web site is created in step 72, or it was determined in step 62 that a customized copy of the master Web site already exists for this account, control passes to step 74, where the Core Engine 32 redisplays the account holder copy of the master Web site in an "Edit" mode. In the present embodiment, in the Edit mode, the Core Engine 32 inserts "Edit" buttons to the displayed Web page of the account holder copy of the master Web site near each element of the page that is customizable. For example, an "Edit" button will be inserted near the Favorites list, since that list is customizable. At step 67, the account holder can then click on the "Edit" button next to a given customizable element to invoke the customization/personalization interface 48 for that element. Clicking on the "Edit" button next to the Favorites list, for example, will invoke the Update Favorites interface 50. Once all desired elements are customized in this manner, the customization process ends, and control passes back to the administrative menu.

Figure 5:
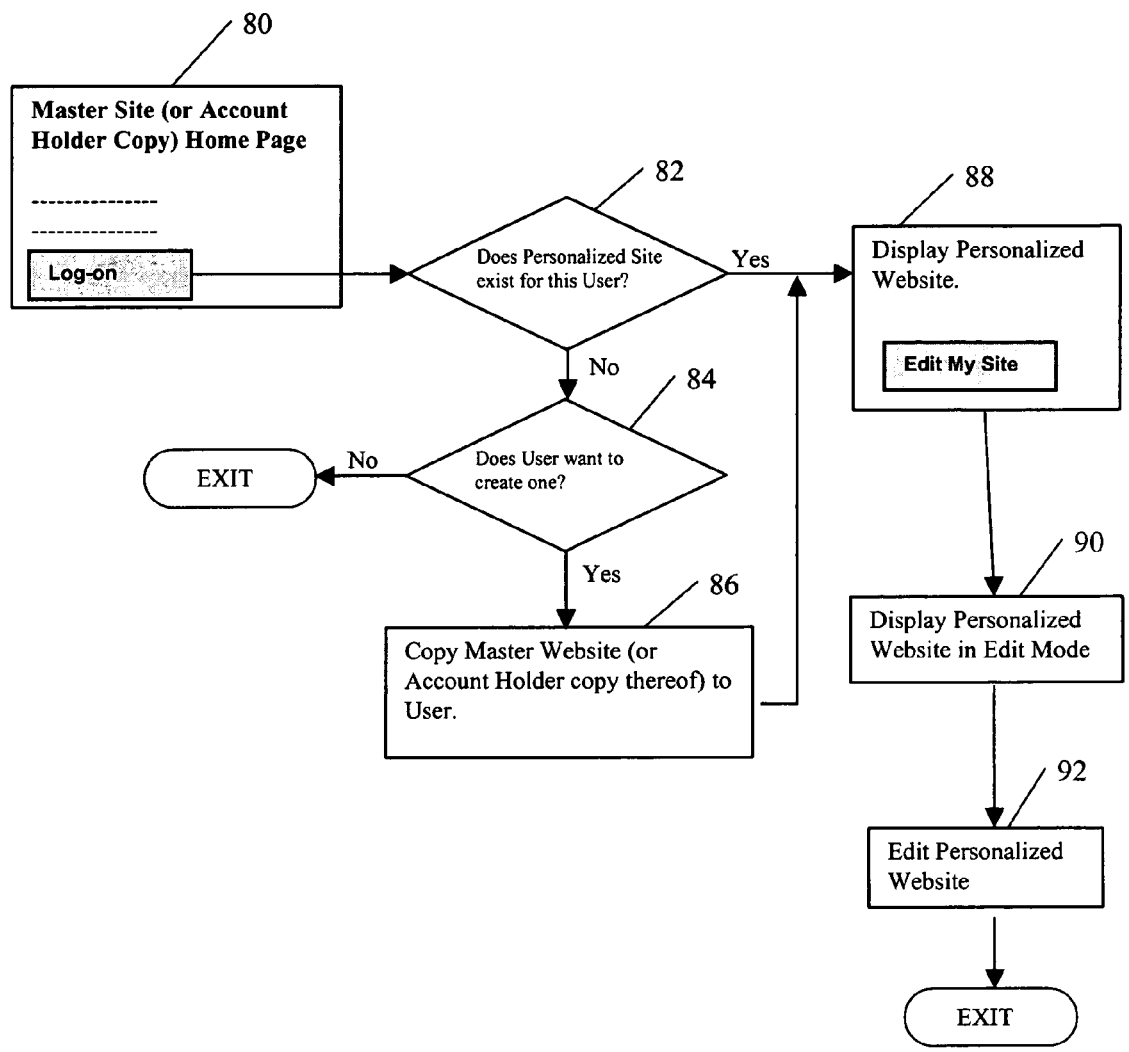
FIG. 5 is a flow diagram illustrating still further details of the operation of the system of FIG. 2, as well as a preferred embodiment of another aspect of the method of the present invention.

FIG. 5 is a flow diagram illustrating the process of user customization (i.e., personalization) of the master Web site or one of the account holder copies thereof, in accordance with the present embodiment of the system and method of the present invention. At step 80, a registered user of the second class (who may be a user in the public account or a user in one or the account holder accounts) logs-on to the server 20 at the master Web site or an account holder copy of the master Web site. Control then passes to step 82, where the Core Engine 32 determines whether this user has previously created a personalized copy of the site. If not, then control passes to step 84 where the user is asked whether the user wishes to create a personalized copy of the site. If the user does not wish to create a personalized copy, then the user is returned to the main page of the site, where the user can access the normal features of the site.

If at step 84, the user chooses to create a personalized copy of the site, then control passes to step 86 where the definition file for the site is copied to the user's profile in the database 46. In the present embodiment, step 86 is carried out by Create Site utility 36 at the direction of the Core Engine 32.

Once the user copy of the site is created in step 86, or it was determined in step 82 that a personalized copy of the site already exists for this user, control passes to step 88, where the Core Engine 32 displays the user personalized copy of the site. In the present embodiment, an "Edit My Site" button is displayed on the main page of a user personalized copy of a site. If the user clicks on this button, then control passes to step 90 where the Core Engine 32 redisplays the user personalized copy of the site in an "Edit" mode. In the present embodiment, in this Edit mode, the Core Engine 32 inserts "Edit" buttons to the displayed Web page of the user personalized copy of the site near each element of the page that is customizable. This is similar to the manner in which an account holder customizes its copy of the master Web site (as described above) except that, in the present embodiment, the level of customization available to the user will be less than is available to an account holder. Of course, in other embodiments, both classes of users could be given the same level of customizability, if desired. Alteratively, in other embodiments, users of the second class could be given a greater level of customizability than users of the first class. The present invention is completely flexible in this regard.

At step 92, the user can then click on the "Edit" button next to a given customizable element to invoke the customization/personalization interface for that element. Clicking on the "Edit" button next to the Favorites list, for example, will invoke the Update Favorites interface 50. Once all desired elements are customized in this manner, the customization process ends, and control passes back to step 88.

For purposes of further illustrating the present invention, FIGS. 6 through 14 depict an exemplary master Web site (or account holder copy thereof) and exemplary customization/personalization interfaces that are displayed to account holders and users of this site, in accordance with the present invention. The Web page elements illustrated in these figures are merely exemplary. In practice, a master Web site created for use with the system and method of the present invention may contain any number and type of Web page elements available to Web site designers, and the present invention is by no means limited to the numbers and types of Web page elements illustrated in FIGS. 6 through 14.

Figure 6:
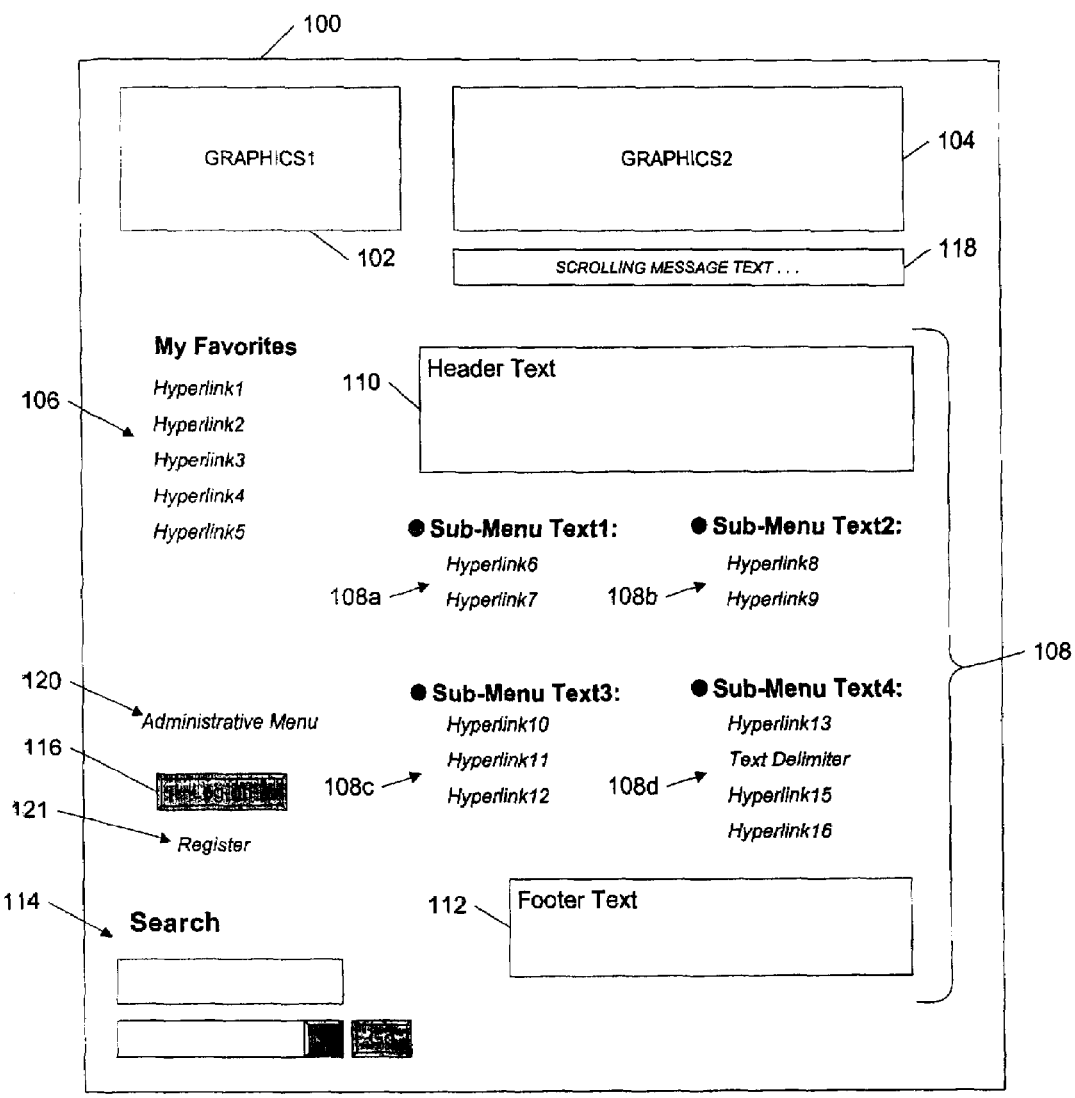
FIG. 6 depicts an exemplary master Web site or account holder copy thereof, that can be provided in accordance with the present invention.

FIG. 6 depicts an exemplary main Web page 100 of a Web site that could be a master Web site or an account holder copy thereof in accordance with the present invention. For example, this Web page could be the main page of the master Web site 10 illustrated in FIG. 1, having a URL of www.a-masterwebsite.com, or it could be the main page of one of the account holder copies 12a, 12b, or 12c. The exemplary Web page 100 has a number of Web page elements, including two graphics images 102 and 144, text of a scrolling message 118, a "My Favorites" list of hyperlinks (i.e., Hyperlink1 . . . Hyperlink5), a menu 108 organized as a plurality of sub-menus of hyperlinks 108a-d and intermixed text, header text 110 positioned at the top of the menu 108, and footer text 112 positioned at the bottom of the menu 108. In this example, the header text 110 and footer text 112 are considered part of the menu 108, although on other Web page designs they might not be. The Web page 100 also provides an interface 114 for searching on the Web site or elsewhere on the network to which it is attached. A "Register" link 121 is provided to enable new users to register with the server, in the manner described above and illustrated in FIG. 3A. The Web page 100 can also include other Web page elements (not shown), such as animations, videos, Java Applets, Active X controls, and the like. Some or all of these different Web page elements may be customizable in accordance with the present invention.

In the present embodiment, the Web page 100 also has a "Log-on" button 116 that can be used by both account holders and users of the second class to logon to the server 20. Clicking on the "Log-on" button will prompt the user for the user's UserID and password. As discussed above, in the case of a user of the second class, this will initiate the process illustrated in FIG. 5, beginning at step 80. In the case of an account holder, logging on to the server 20 via the "Log-on" button will enable access to an administrative menu via an "Administrative Menu" link 120 illustrated in FIG. 6. Clicking on the link 120 will place the account holder at step 60 in FIG. 4, from which the user can select various account holder administrative options, including, as described above, creation and/or customization of an account holder copy of the master Web site.

Figure 7:
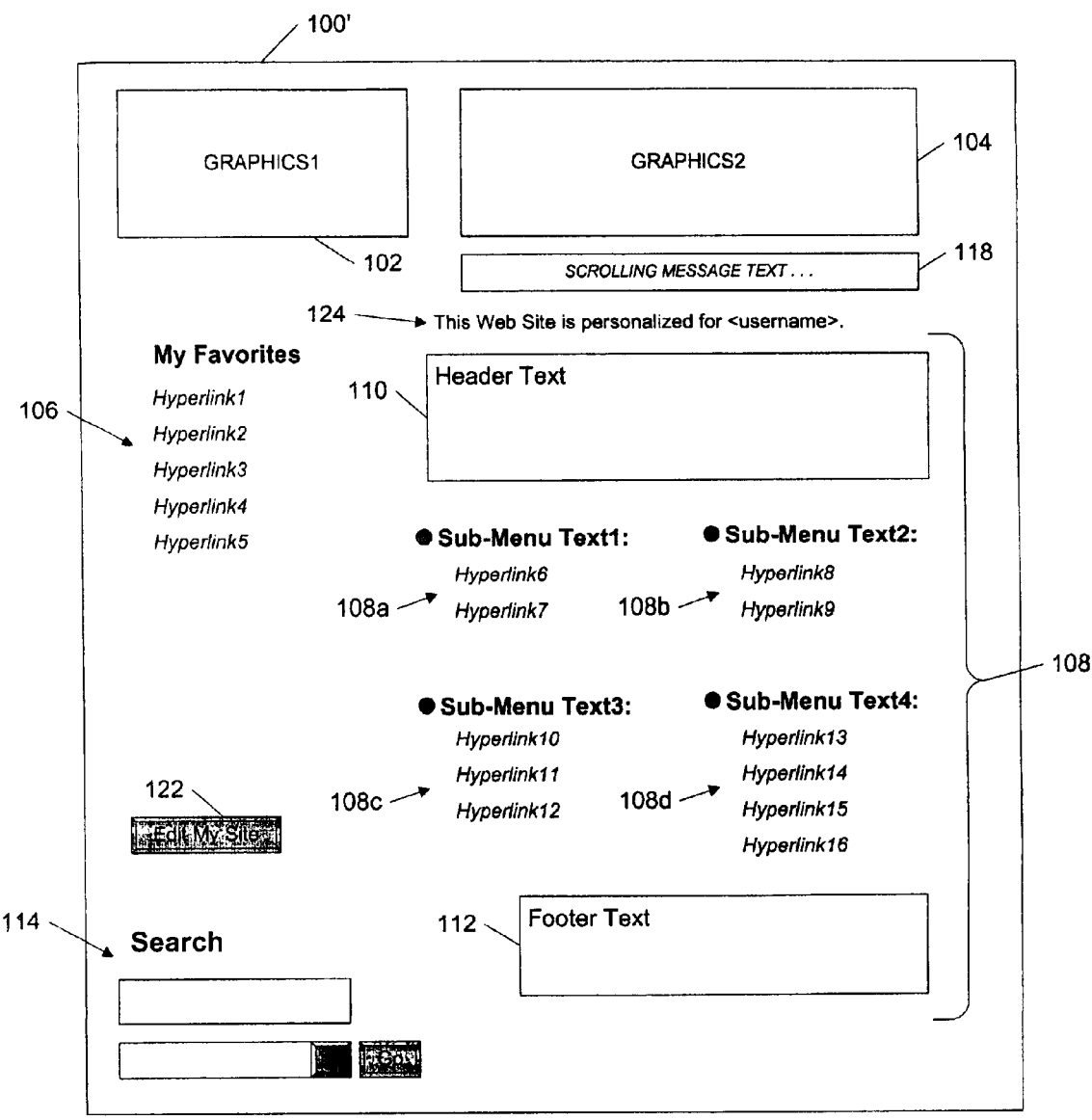
FIG. 7 depicts a copy of the Web site depicted in FIG. 6, which has been personalized by a user in accordance with the present invention.

FIG. 7 illustrates how the Web page 100 might be displayed to a user of the second class that has successfully logged on to his/her personalized copy of the master Web site or an account holder copy thereof (i.e., the display provided to the user in step 88 of FIG. 5). As shown, the "Log-on" button has been replaced by an "Edit My Site" button, and text 124 has been added to indicate that this is the user's personalized copy of the site. In this example, the remainder of the personalized copy of the Web page 100 is unchanged.

Figure 8:
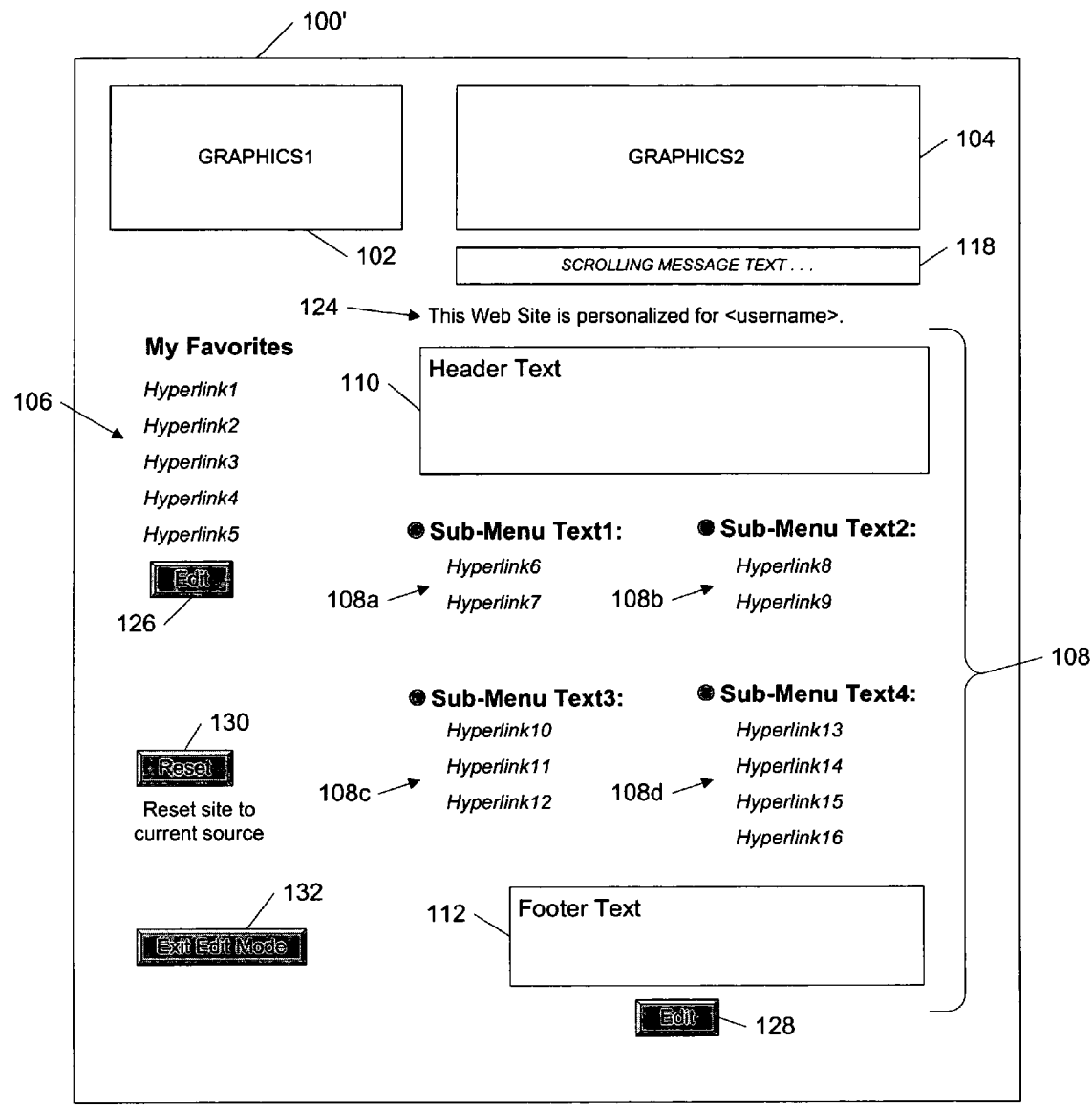
FIG. 8 depicts the Web site of FIG. 7 displayed in an "Edit" mode, in accordance with the present invention.

When the user clicks the "Edit My Site" button 122, the Core Engine 32 redisplays the personalized copy of the Web page 100' in the "Edit" mode, as described above (see, step 90 of FIG. 5). FIG. 8 shows how the personalized copy of the Web page 100' illustrated in FIG. 7 is displayed to the user in "Edit" mode. As shown, the Core Engine 32 has inserted "Edit" buttons 126 and 128 near the "My Favorites" list and the menu 108, indicating to the user that these elements of the Web page are customizable. Clicking either of these "Edit" buttons will invoke the associated customization/personalization interface 48 for that Web page element. In the present embodiment, for example, clicking the "Edit" button 126 will invoke the Update Favorites interface 50 (FIG. 2). Similarly, clicking the "Edit" button 128 will invoke the Update Menu interface 56 (FIG. 2). Note that, in this example, a user of this class is not permitted to customize the graphics images 102, 104 or the text of the scrolling message 118. Thus, no "Edit" buttons are present for those elements. In addition to the "Edit" buttons 126 and 128, the Core Engine 32 has provided a "Reset" button 130 and an "Exit Edit Mode" button 132.

Clicking the "Reset" button will reset the definition file that defines this personalized copy of the site to the original definition file for the site. Any previous customization will thus be removed. This allows the user to start over, if desired. Clicking the "Exit Edit Mode" button 132 will return the user to the normal display of his/her personalized copy of the site, i.e., to the view shown in FIG. 7 (except that any modifications made while in "Edit" mode will now be in effect).

Figure 9:
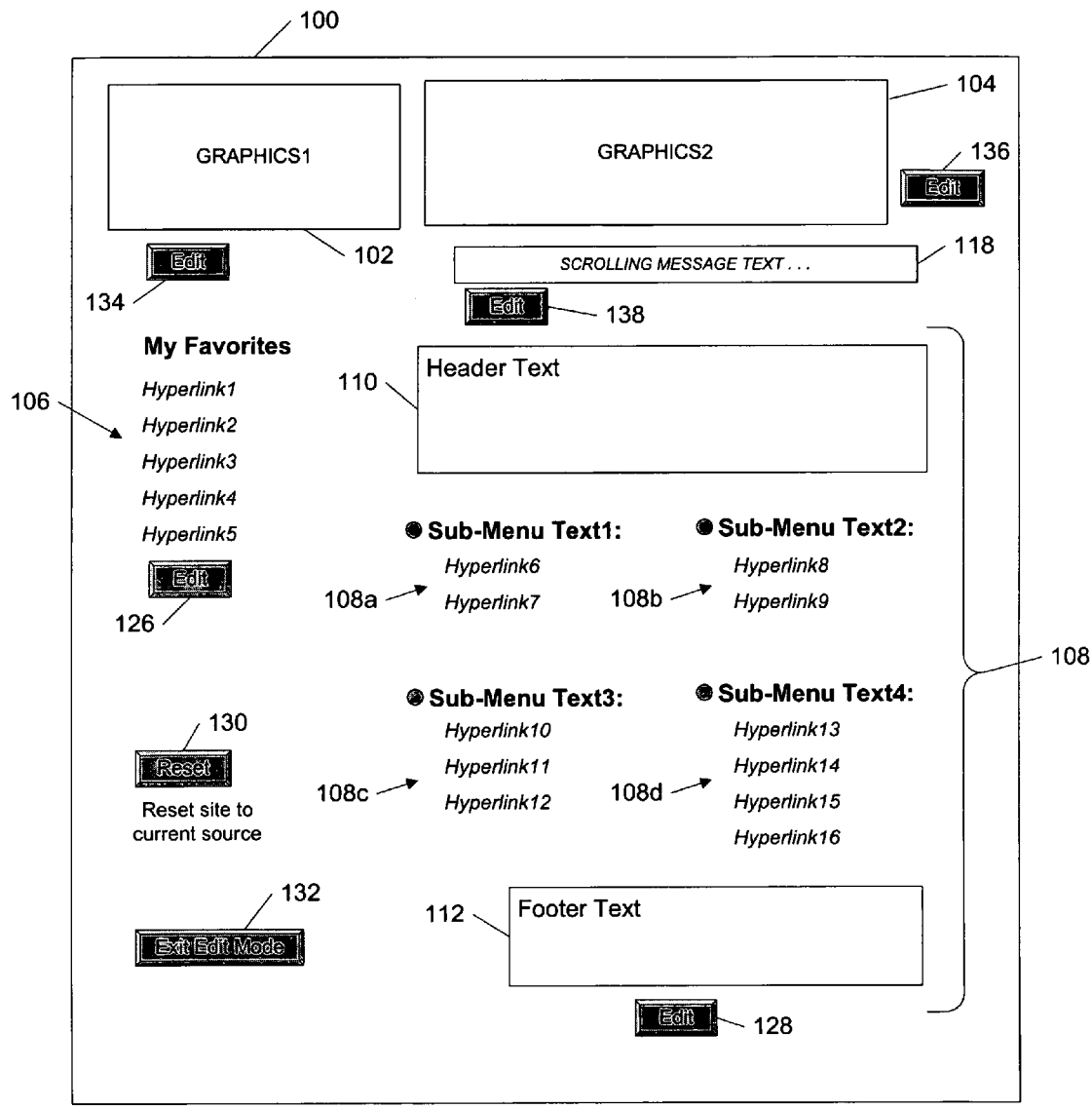
FIG. 9 depicts the Web site of FIG. 6, as it would be displayed in "Edit" mode to an account holder, in accordance with the present invention.

FIG. 9 provides an example of how an account holder copy of the main Web page of the exemplary master Web site of FIG. 6 would be displayed to the account holder in "Edit" mode (i.e., the display provided in step 74 of FIG. 4). This display is similar to the display provided to a user in FIG. 8, except that additional "Edit" buttons 134, 136, and 138 are provided for invoking the respective customization/personalization interfaces 48 for customizing graphics images 102 and 104 and the text of the scrolling message 138. Thus, as shown, an account holder is permitted to customize a greater degree of the Web site than a user of the second class. Clicking "Edit" button 134 will invoke the Update Image interface 54 to enable the account holder to change graphics image 102, and clicking "Edit" button 136 will do the same for graphics image 104. Clicking "Edit" button 138 invokes the Update Scrolling Message interface 52.

Figure 10:
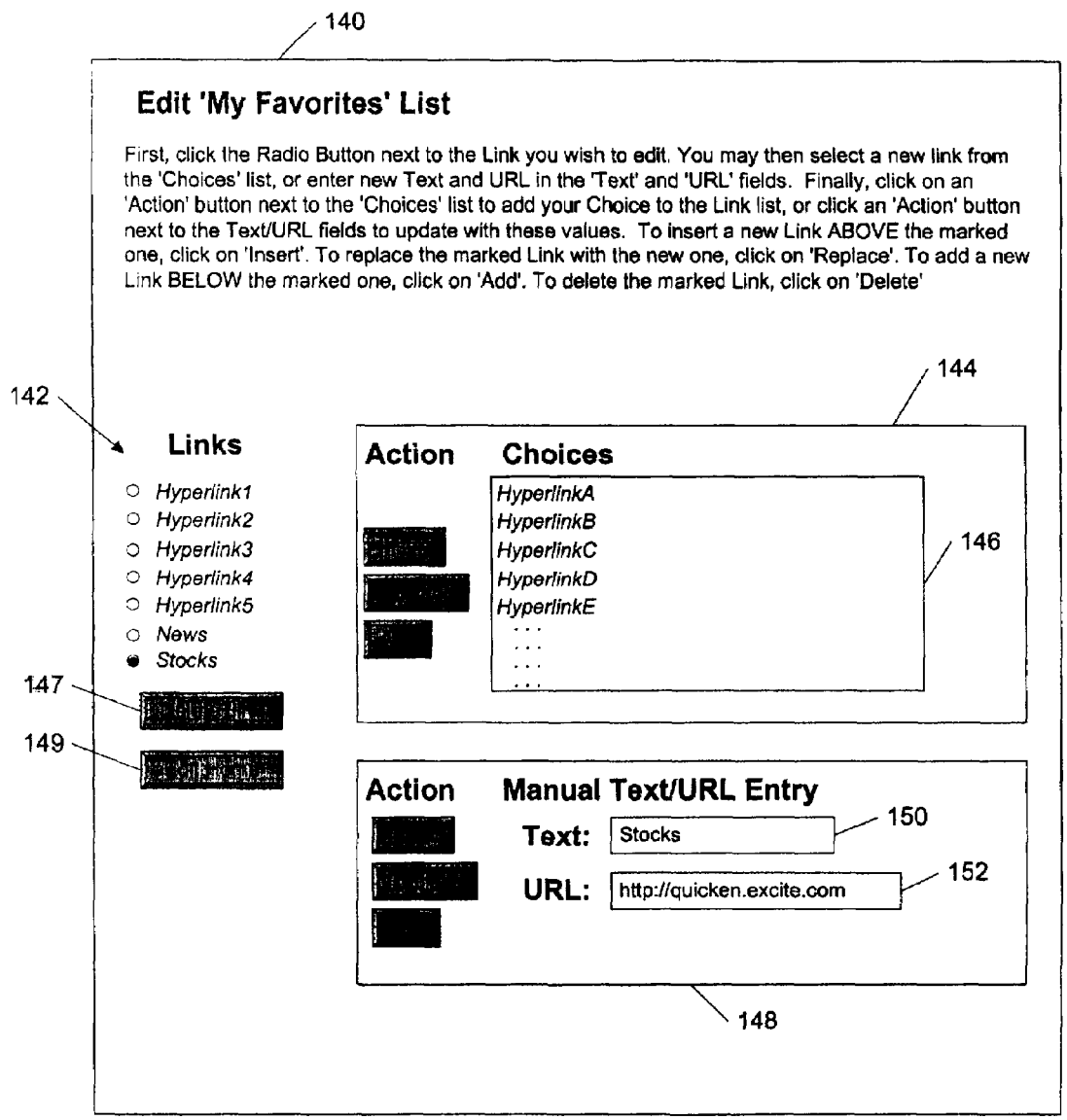
FIG. 10 depicts an exemplary Web page of an Update Favorites interface of the system of FIG. 2.

FIG. 10 shows the Update Favorites interface 50 in accordance with the present embodiment of the invention. As shown, the interface 50 consists of an HTML form-based Web page 140 that is displayed to the user or account holder. The current hyperlinks in the user or account holder's "My Favorites" list are displayed at 142. Radio buttons are displayed next to each hyperlink to enable the user or account holder to select that hyperlink for editing. The user or account holder can use two different action windows 144 and 148 for making changes to the list of hyperlinks. The first action window 144 displays the canned list of URLs provided by the owner of the server 20, from which the user or account holder can select to replace, insert, or add hyperlinks to the "My Favorites" list. The second action window 148 allows the user or account holder to define new links or to place a test delimiter in the list. A first text box 150 is used to enter the text that will be displayed in the "My Favorites" list, and the second text box 152 is used to enter a URL for a new link to be associated with the text. For example, as shown in FIG. 10, a new link having the text "Stocks" and a URL of http://quicken.excite.com has been added to the "My Favorites List". If the URL text box 152 is left blank, then the text in box 150 will appear in the list, but will not be an active link. Thus, text delimiters can be inserted in the "My Favorites List" in this manner.

Both action windows 144 and 148 include an "Insert" button, an "Add" button, and a "Replace" button. The "Replace" button replaces a selected hyperlink with a new link either selected from the canned list 146 in action window 144 or the user-defined link in action window 148. The "Add" button will add a canned link or user-defined link below the currently selected link at 142, and the "Insert" button will insert a canned link or user-defined link above the currently selected link. Additionally, a "Delete Link" button 147 is provided for deleting a selected hyperlink from the list. Finally, an "Edit Home" button is provided that, when clicked, takes the user or account holder back to the display shown in FIG. 8 (for users) or FIG. 9 (for account holders). Further instructions for using the Update Favorites interface 50 are provided as text on the Web page 140, as shown.

Figure 11:
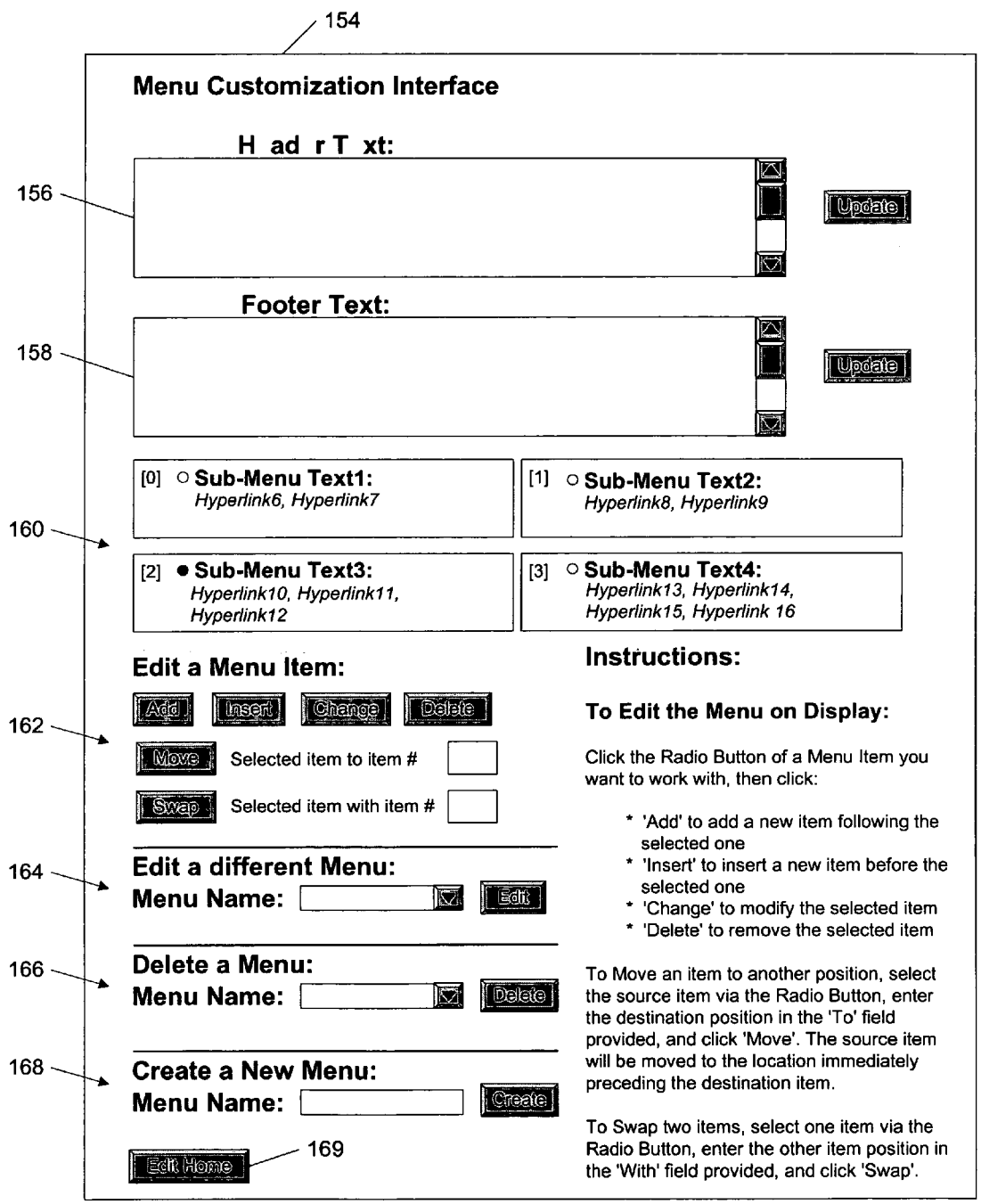
FIGS. 11 and 12 depict exemplary first and second Web pages, respectively, of an Update Menu interface of the system of FIG. 2.
Figure 12:
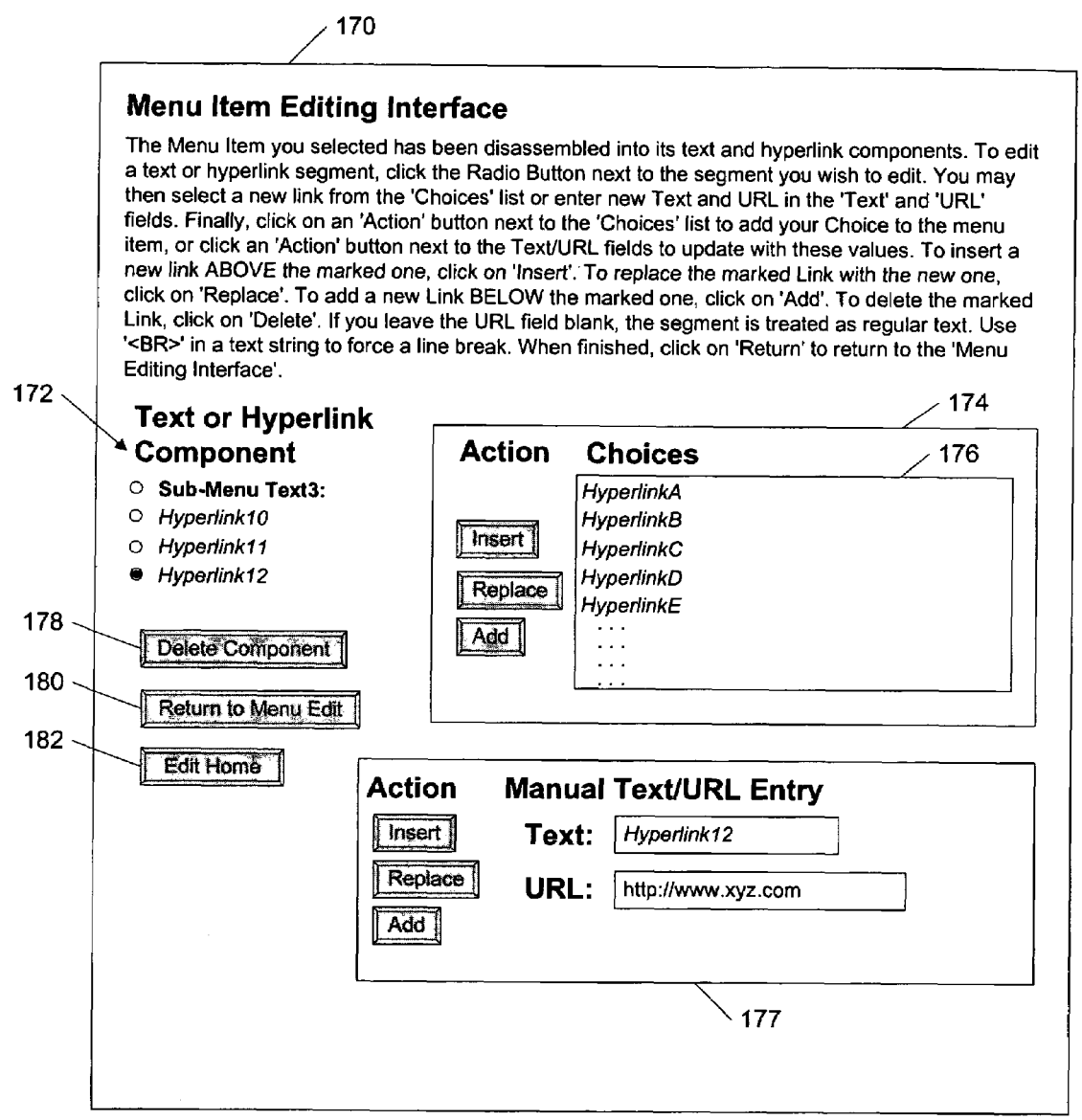

FIGS. 11 and 12 show the Update Menu interface 56 in accordance with the present embodiment of the invention. The interface 56 consists of two HTML form-based Web pages 154 (FIG. 11) and 170 (FIG. 12). By way of example, FIGS. 11 and 12 show how the pages of the Update Menu interface 56 would look when the user of the personalized copy of the site shown in FIG. 8 clicks the "Edit" button 128 in that Figure.

Referring first to FIG. 11, this page of the Update Menu interface provides separate text editing windows 156 and 158 for editing the header text and footer text of the site being customized (e.g., header text 110 and footer text 112 shown in FIG. 8). The current text will be displayed in the respective editing windows 156 and 158, and the user or account holder can then edit the text in those windows. Changes to the text are confirmed by pressing the respective "Update" button next to the editing window.

Following the editing windows 156 and 158, the Update Menu interface 56 next displays, at 160, each sub-menu of the site being customized (e.g., sub-menus 108a, 108b, 108c, and 108d shown in FIG. 8). As shown, each sub-menu is displayed in its own editing window. Each sub-menu editing window is assigned a number (shown in brackets) that indicates its order on the Web page of the site being customized, and each window includes a radio button by which the user can select that sub-menu for editing (sub-menu "[2]" is currently selected in FIG. 11, as indicated by the condition of its radio button).

At 162, the interface provides "Add," "Insert," "Change," and "Delete" buttons for adding and inserting new sub menus and for changing and deleting the currently selected sub-menu (i.e., the one whose raid button is currently selected), respectively. "Move," and "Swap" buttons are also provided for rearranging the order of the sub-menus. Instructions for using these buttons are provided on the page, as shown.

In the present embodiment, the Update Menu interface 56 also permits a user or account holder to create new menus for the customized site. When new menus are created, they are added to the canned URL list for that user and account holder, and thus, the user or account holder can then provide access to those other menus by, for example, adding links to them in the "My Favorites" list. To facilitate adding, deleting, and editing other menus, the first page 154 of the Update Menu interface 56 includes three additional editing options at 164, 166, and 168, respectively. At 164, a drop down list of existing menus in that user or account holder's site is provided to enable the user or account holder to select a given menu for editing. The user or account holder selects a menu from the drop down list and then presses the "Edit" button next to the list to "bring up" the newly selected menu in the Update Menu interface 56 in place of the previous one.

At 166, another drop down list is provided to enable the user or account holder to select a given menu to be deleted. A menu to be deleted is selected from the drop down list, and then the user or account holder clicks the "Delete" button to confirm the deletion.

At 168, a text box and associated "Create" button are provided to enable the user or account holder to create a new menu. A name for the new menu is entered in the text box, and then the user or account holder clicks the "Create" button to "bring up" a blank menu in the Update Menu interface 56. Header and footer text and new sub-menus for the new menu can then be created using the editing windows 156 and 158 and the series of editing buttons 162, respectively.

When a user or account holder clicks one of the "Add," "Insert," or "Change" buttons at 162 to add or insert a new sub menu or to change an existing sub menu item, the second page 170 of the Update Menu interface 56 is displayed, as shown in FIG. 12. In particular, FIG. 12 shows what this second page 170 would look like if the user or account holder had selected sub-menu "[2]" from FIG. 11 and then clicked the "Change" button at 160. This "brings up" that sub-menu in page 170 for editing.

Referring to FIG. 12, the HTML form-based editing interface for sub menu items is similar to the editing interface of the Update Favorites interface 50 shown in FIG. 10, except that instead of adding, changing, inserting and deleting hyperlinks and intermixed text in the Favorites list, the interface of page 170 permits the user to add, change, insert, and delete the hyperlinks and intermixed text (e.g., the Test Delimiter in sub-menu 180d) of the particular sub-menu. Like the Update Favorites interface 50 (FIG. 10), this page 170 of the Update Menu interface 56 provides a first action window 174 that allows the user or account holder to select links from the canned link list in window 176, and a second action window 177 that the user or account holder can use to define his/her own links and intermixed text. The "Delete Component" button 178 operates like the "Delete Link" button 147 of the Update Favorites interface 50 (FIG. 10). The "Return to Menu Edit" button 180 takes the user or account holder back to the first page 154 of the Update Menu interface 56 (FIG. 11). The "Edit Home" button 182 operates like the "Edit Home" button 149 of the Update Favorites interface 50 (FIG. 10). Further instructions for using the interface are provided as text on the page 170, as shown.

Figure 13:
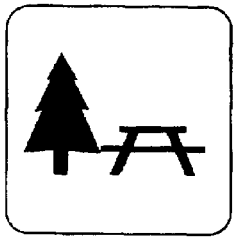
FIG. 13 depicts an exemplary Web page of an Update Image interface of the system of FIG. 2.

FIG. 13 shows the Update Image interface 54 that is used to customize any of the graphics images on a site in accordance with the present embodiment of the invention. In the present embodiment, this interface is available only to account holders, not to the second class of users. As shown, the Update Image interface 54 consists of an HTML form-based Web page 184 that is displayed to the account holder. This interface would be invoked, for example, if the account holder of the customized site illustrated in FIG. 9 clicked either of the two "Edit" buttons next to graphics images 102 or 104.

When the interface 54 is initially displayed, the current image and its type are displayed in the "Image" and "Image Type" fields. If any text has been defined to be displayed if the client browser has graphics disabled, that text will be displayed in the "Image Text" field. Also, any "hotlink" URL that is defined behind the current image will be displayed in the "Hotlink' URL" field. Changes can be made to the Image Text and the Hotlink URL, if desired. Pressing the "Submit" button at the bottom of the page effectuates the changes. The "Reset Fields" button resets all fields to the current values. The "Cancel" button exits this interface. The account holder can replace the current image with a new graphics image in either of two ways.

In the first approach, the account holder can send a new image file to the server 20 via the network 24, storing the image locally. Then, this interface 54 is invoked. In the "Image Source" drop-down box, the account holder selects "File" to indicate that the image is stored locally, and then enters the local path to the image file in the "Image Source Path" text box. The change is then effectuated by clicking the "Submit" button. The "Refresh Image" button will refresh the "Image" field to display the new image.

In the second approach, the new image is accessed from a remote storage location on the network. This is done by selecting a "URL" option (not shown) in the "Image Source" drop-down box, and then specifying a URL for the remotely located image in the "Image Source Path" text box. This causes the image to be retrieved dynamically from the remote location whenever the customized account holder copy of the site is displayed by the Core Engine 32 using the image locator 44. The "Submit" and "Refresh Image" buttons can then be used as described above.

Figure 14:
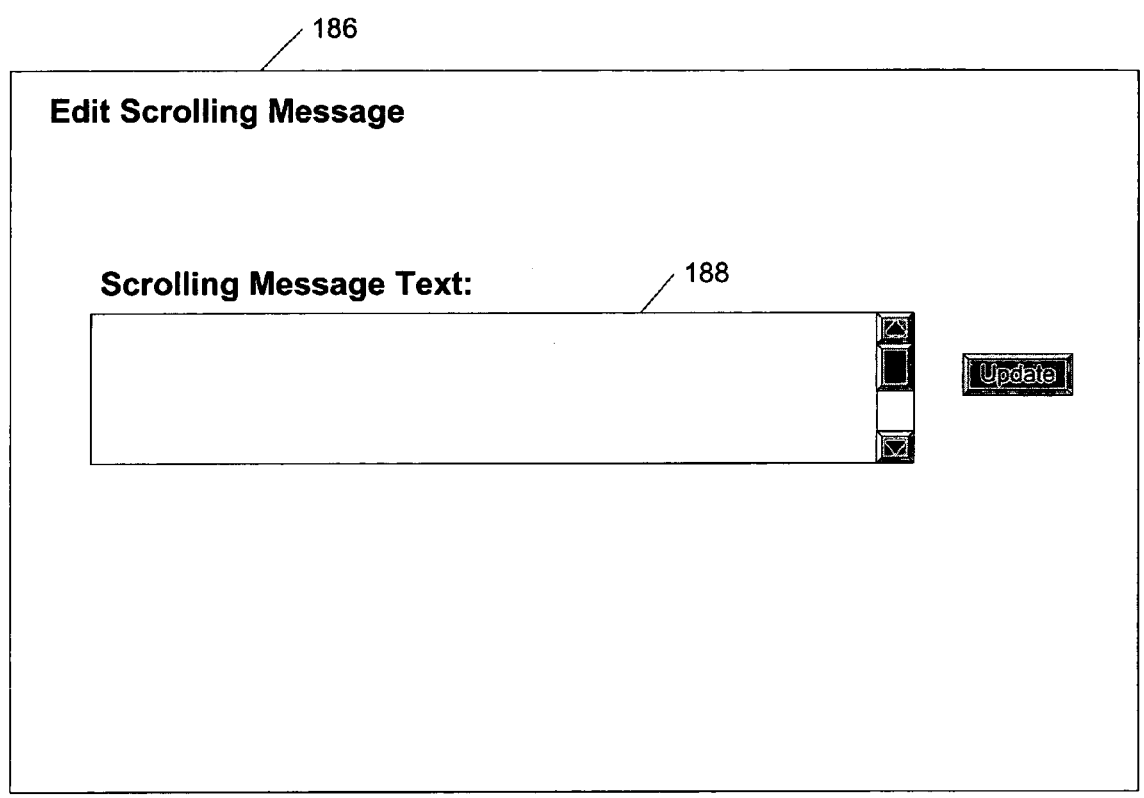
FIG. 14 depicts an exemplary Web page of an Update Scrolling Message interface of the system of FIG. 2.

FIG. 14 shows the Update Scrolling Message interface 52, in accordance with the present embodiment of the invention. In the present embodiment, this interface 52 is only available to account holders. An account holder edits the text of the scrolling message in editing window 188, and then clicks the "Update" button to effect the change. The account holder is then automatically returned to the "Edit" mode display (FIG. 9).

Figure 15:
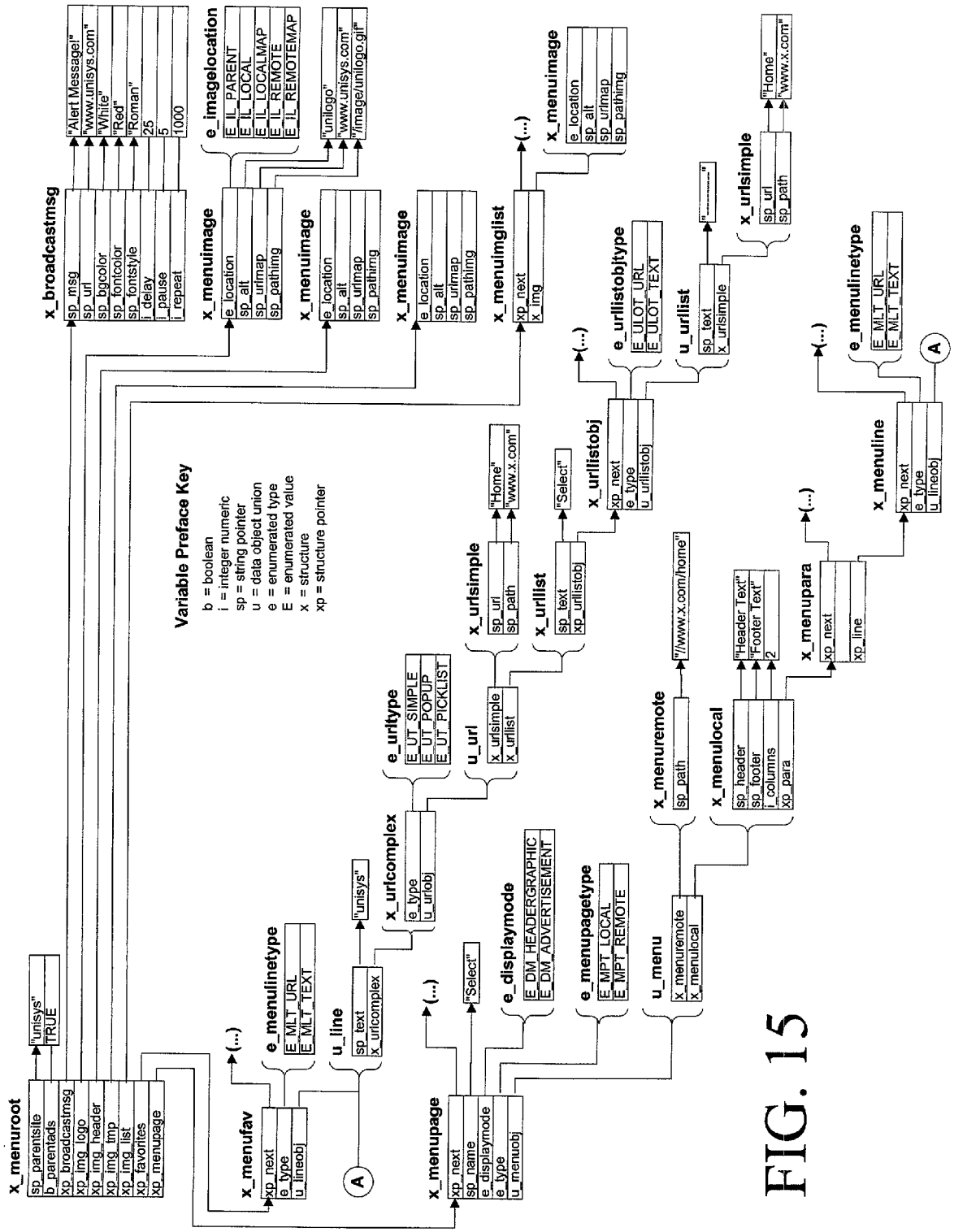
FIG. 15 illustrates the content and layout of an exemplary Website definition file, in accordance with an embodiment of the present invention.

FIG. 15 graphically illustrates the general contents and arrangement of information in an exemplary definition file of a master Web site, or any account holder copy or user personalized copy thereof, in accordance with the present embodiment. In the present embodiment, the information in the file is loaded into a C-language data structure for access by the Core Engine 32 when needed. The definition file illustrated in FIG. 15 may comprise a file, a plurality of files, a data structure of a particular programming language, an object in an object-oriented environment, or any other structure capable of storing the information contained therein. Thus, use herein of the term "definition file" is not intended to be limiting.

Referring to the Figure, the section labeled x_menuroot is a table of links to other sections that describe the various Web page elements. An x_menuroot structure and its associated Web page element structures exist for the master Web site, and each instance of a customized or personalized Web site.

The section labeled x_broadcastmsg defines the characteristics of the Scrolling Message 118, including the Message Text, URL, Background Color, Font Color, Font Style, Delay Time between message presentations, Scroll Rate (i_pause), and number of times to repeat the message. When the account holder updates the Scrolling Message text using the interface 52, the x_broadcastmsg table is updated to reflect the account holder's changes. While in the present embodiment, as illustrated in FIG. 14, the interface 52 allows a user to modify the text of the scrolling message, in other embodiments, this interface can be enhanced to allow other characteristics of the Scrolling Message 118 to be modified, such as, for example, the Background Color, the URL "behind" the message text, the Scroll Rate, etc.

The sections labeled x_menuimage define the attributes of the various graphical images as referenced from the x_menuroot table. These attributes include the Image Location (which may be the Parent Web site from which this site was customized/personalized, a Local file, a Local image-mapped file, a Remote file, or a Remote Imagemapped file), the Alternate Text to be displayed if the user has images disabled in his/her browser, the server where the image is located, and the path within the server to access the image. When an account holder edits a graphic image using the Update Image interface 54, the changes are made to the appropriate x_menuimage table as defined by the x_menuroot table entries xp_img_logo, xp_img_header, or one of the 'ad graphics' in x_img_list, depending on which button of the interface 54 the account holder clicks on.

The section labeled x_menufav defines the Favorites list 106. Each line item in the Favorites list has an x_menufav descriptor. The descriptor consists of a variable number of lines depending on what the item is. The diagram shows for each "line" what the options are. Items preceded by a brace ("{") are included in the previous field, whereas items pointed to by an arrow are separate substructures. The x_menufav e_type field identifies whether the line item is text only, or a URL. If text, u_lineobj points to the text string. If a URL, u_lineobj is another e_type (under x_urlcomplex—SIMPLE, POPUP, or PICKLIST), followed by a u_urlobj. If e_type is SIMPLE, u_urlobj is two lines—pointers to the URL and the path. If e_type is POPUP or PICKLIST, u_urlobj takes the x_urllist path, and consists of a pointer to the text string followed by a pointer to the list objects in the popup or picklist.

The x_urllistobj is a series of line items, each of which can be text only or a URL, similar to the original line items in the Favorites list, except that, in the present embodiment, picklists and popups can't be nested.

When a user or account holder edits the Favorites list, the changes that the user makes via the Update Favorites interface 50 are made to the x_menufav section, either by adding a new x_menufav occurrence, or changing something in an existing occurrence.

The x_menupage section defines the Menu Pages. Each menu page is the master Web site, and in every customized or personalized Web site, has an x_menupage descriptor. The descriptor consists of a variable number of lines depending on the type of menu page. The diagram shows for each "line" what the options are. Items preceded by a brace ("{") are included in the previous field, whereas items pointed to by an arrow are separate substructures. Each menu page has a Name unique within its Web site. The main menu page (the first one to be displayed when the user inputs the Web site URL) is always called "main". Other pages are given names by the user who creates them. The sp_name field points to the menu page name for its menu page.

The e_displaymode field indicated whether the menu page includes the Header Graphic (e.g., 102) (xp_img_header from the x_menuroot table) and/or Advertisement Graphics (e.g., 104) (xp_img_list from x_menuroot) associated with this Web site.

The e_type field indicate whether the menu page is locally resident or on a remote server. If remote, u_menuobj points to the path to the menu page on the remote server. If the menu is local, u_menuobj is four lines, shown under x_menulocal. The first three lines point to the menu header text (see, FIG. 6 at 110, FIG. 11 at 156), footer text (see, FIG. 6 at 112, FIG. 11 at 158), and number of columns associated with this menu page. The fourth line, xp_para, points to a list of menu "paragraphs", also referred to herein previously as sub-menus (see, e.g., submenus 108a-d in FIG. 6; see also FIG. 11 at 160), described under x_menuparar. There is an x_menupara item for each paragraph, or sub-menu, in this menu page. Each x_menupara item, in turn, points to a list of line items (see, e.g., FIG. 12 at 172) which make up this menu paragraph, shown under x_menuline. There is an x_menuline item for each line item in this menu paragraph. The x_menuline structure is identical to the x_menufav structure, described above. When a user or account holder edits a Menu using the Update Menu item interface 56, the changes are made in the x_menupage section As is apparent from the above, all or portions of the system and method of the present invention, including, without limitation, the Core Engine 32, the customization/personalization interfaces 48, the user and account holder customization profiles, the utilities 34, and the Web server 28 may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and execute by a machine, such as a computer or server, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Microsoft and the Microsoft Internet Explorer logo are a registered trademarks of Microsoft Corporation. Java is a trademark of Sun Microsysmtes, Inc. Netscape and Navigator are registered trademarks of Netscape Communications Corporation.

As the foregoing illustrates, the present invention is directed to a system and method for providing a customizable Web portal service. The present invention can be used to provide any of a wide variety of customizable Web portal services, including for example, portals for helpdesk services, travel services, on-line shopping services, etc. The present invention can also be used to provide customizable Web site services for other, non-portal types of Web sites, and the present invention is by no means limited to the provision of Web portal services only. It is understood that changes may be made to the embodiment described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A Method for providing a customizable Web site service comprising the steps of:
   (a) hosting, on a server, a master Web site;
   (b) enabling a user of a first class to hold an account on the server, said user of a first class defining an account holder, and hosting on the server, for the account holder, a separate copy of the master Web site;
   (c) enabling the account holder to customize the copy of the master Web site in accordance with a first level of server-side customizability; and
   (d) enabling a user of a second class to create a customized copy of the master Web site or an account holder copy thereof in accordance with a second level server-side of customizability,
   assigning a unique Uniform Resource Locator (URL) to the account holder copy of the master Web site and providing the unique URL to the account holder, and,
   wherein said assigning and providing steps are performed automatically by the server.

2. The method recited in claim 1, wherein the master Web site comprises a portal site, said portal site comprising a web page providing a set of hyperlinks.

3. The method recited in claim 1 wherein the master Web site comprises at least one Web page, and wherein said at least one Web page of the master Web site comprises a combination of Web page elements.

4. The method recited in claim 3, wherein the first level of customizability allows customization of a greater number of Web page elements than said second level of customizability.

5. The method recited in claim 3, wherein said Web page elements comprise at least ones of text, graphics, and hyperlinks.

6. A method for providing a customizable Web site service comprising the steps of:
   (a) hosting, on a server, a master Web site;
   (b) enabling users of a first class to hold accounts on the server, said users of a first class defining account holders, and hosting on the server, for each account holder, a separate copy of the master web site;
   (c) enabling each account holder to customize its copy of the master Web site in accordance with a first level of server-side customizability; and
   (d) enabling users of a second class to create customized copies of the master Web site and the account holder copies thereof in accordance with a second level of server-side customizability,
   assigning a unique Uniform Resource Locator (URL) to each account holder copy of the master Web site and providing each account holder with the unique URL of its copy of the master Web site, and
   wherein said assigning and providing steps are performed automatically by the server.

7. The method recited in claim 6, wherein the master Web site comprises a Web portal site, said Web portal site comprising a web page providing a set of hyperlinks.

8. The method recited in claim 6, further comprising the steps of assigning a unique Uniform Resource Locator (URL) to each account holder copy of the master Web site and providing each account holder with the unique URL of its copy of the master Web site.

9. The method recited in claim 6 wherein the master Web site comprises at least one Web page, and wherein said at least one Web page of the master Web site comprises a combination of Web page elements.

10. The method recited in claim 9, wherein the first level of customizability allows customization of a greater number of Web page elements of the master Web site or a copy thereof than said second level of customizability.

11. The method recited in claim 9, wherein said Web page elements comprise at least ones of text, graphics, and hyperlinks.

12. A system for providing a customizable Web site service, comprising:
   (a) a server computer hosting a master Web site, and also hosting, for each user of a first class that holds an account on the server, said user of a first class defining an account holder, a separate copy of the master Web site; and
   (b) interfaces to the server by which an account holder can customize its copy of the master Web site in accordance with a first level of server-side customizability, and by which users of a second class can create customized copies of the master Web site and the account holder copies thereof in accordance with a second level of server-side customizability, and
   wherein the server computer assigns a unique Uniform Resource Locator (URL) to each account holder copy of the master Web site.

13. The system recited in claim 12, wherein the master Web site comprises a Web portal site, said Web portal site comprising a web page providing a set of hyperlinks.

14. The system recited in claim 12 wherein the master Web site comprises at least one Web page, and wherein said at least one Web page of the master Web site comprises a combination of Web page elements.

15. The system recited in claim 14, wherein the first level of customizability allows customization of a greater number of Web page elements of the master Web site or a copy thereof than said second level of customizability.

16. The system recited in claim 14, wherein said Web page elements comprise at least ones of text, graphics, and hyperlinks.

17. The system recited in claim 14, wherein the server computer is connected to a network and wherein the server computer further comprises a Web server that transmits the Web pages of the master Web site, the account holder copies of the master Web site, and the customized copies thereof created by users of the second class, to the account holders and users of the second class via the network.

18. The system recited in claim 14, wherein the server generates the Web pages of the master Web site, the account holder copies of the master Web site, and the customized copies thereof created by users of the second class, dynamically from information defining the pages.

19. The system recited in claim 18, wherein the information defining the Web pages of the master Web site, the account holder copies of the master Web site, and the customized copies thereof created by users of the second class, are stored in a database on the server.

20. The system recited in claim 19, wherein the database comprises a plurality of sub-directories, one for each account holder account on the server, the sub-directory for a given account holder account containing the information defining the Web pages of that account holder's copy of the master Web site.

21. The system recited in claim 14, wherein the Web page elements of the master Web site comprises a list of hyperlinks, at least one graphic image, a scrolling message, and a menu comprising a plurality of sub-menus of hyperlinks, and wherein said interfaces comprise an interface for customizing the list of hyperlinks, an interface for customizing the graphic image, an interface for customizing the scrolling message, and an interface for customizing the menu and its sub-menus.

22. A system for providing a customizable Web site service, comprising:
   (a) a server computer system hosting a master Web site;
   (b) means enabling users of a first class to hold accounts on the server computer system, said users of a first class defining account holders, and hosting on the server, for each account holder, a separate copy of the master Web site;
   (c) means enabling each account holder to customize its copy of the master Web site in accordance with a first level of customizability; and
   (d) means enabling users of a second class to create customized copies of the master Web site on said server computer system and the account holder copies thereof in accordance with a second level of customizability, and
   wherein the server computer assigns a unique Uniform Resource Locator (URL) to each account holder copy of the master Web site.

23. The system recited in claim 22, wherein the master Web site comprises a Web portal site, said Web portal site comprising a web page providing a set of hyperlinks.

24. The system recited in claim 22, wherein the master Web site comprises at least one Web page, and wherein said at least one Web page of the master Web site comprises a combination of Web page elements.

25. The system recited in claim 24, wherein the first level of customizability allows customization of a greater number of Web page elements of the master Web site or a copy thereof than said second level of customizability.

26. The system recited in claim 24, wherein said Web page elements comprise at least ones of text, graphics, and hyperlinks.

27. The system recited in claim 24, wherein the server computer is connected to a network, and wherein the server computer further comprises a Web server that transmits the Web pages of the master Web site, the account holder copies of the master Web site, and the customized copies thereof created by users of the second class, to the account holders and users of the second class via the network.

28. The system recited in claim 24, wherein the server generates the Web pages of the master "Web site, the account holder copies of the master Web site, and the customized copies thereof created by users of the second class, dynamically from information defining the pages.

29. The system recited in claim 28, wherein the information defining the Web pages of the master Web site, the account holder copies of the master Web site, and the customized copies thereof created by users of the second class, are stored in a database on the server.

30. The system recited in claim 29, wherein the database comprises a plurality of sub-directories, one for each account holder account on the server, the sub-directory for a given account holder account containing the information defining the Web pages of that account holder's copy of the master Web site.

31. The system recited in claim 22, wherein the Web page elements of the master Web site comprise a list of hyperlinks, at least one graphic image, a scrolling message, and a menu comprising a plurality of sub-menus of hyperlinks, and wherein said means enabling an account holder to customize its copy of the master Web site and said means enabling users of a second class to create customized copies of the master Web site and of the account holder copies thereof, comprise an interface for customizing the list of hyperlinks, an interface for customizing the graphic image, an interface for customizing the scrolling message, and an interface for customizing the menu and its sub-menus.

32. A computer-readable medium having stored thereon program code that when executed causes a server that hosts a master Web site to:
   (a) enable a user of a first class to hold an account on the server, said user of a first class defining an account holder;
   (b) host on the server, for the account holder, a separate copy of the master Web site;
   (c) enable the account holder to customize the copy of the master Web site on said server in accordance with a first level of customizability; and
   (d) enable a user of a second class to create a customized copy of the master Web or an account holder copy thereof hosted on said server in accordance with a second level of customizability, and
   wherein said program code further causes the server to assign a unique Uniform Resource Locator (URL) to the account holder copy to the master Web site and to provide the unique URL to the account holder.

33. The computer-readable medium recited in claim 32, wherein the master Web site comprises a Web portal site, said Web portal site comprising a web page providing a set of hyperlinks.

34. The computer-readable medium recited in claim 32 wherein the master Web site comprises at least one Web page, and wherein said at least one Web page of the master Web site comprises a combination of Web page elements.

* * * * *